United States Patent [19]
Heath

[11] Patent Number: 6,098,942
[45] Date of Patent: Aug. 8, 2000

[54] BAR JOIST CLAMP WITH LOCKING BAR

[75] Inventor: Richard W. Heath, Yorba Linda, Calif.

[73] Assignee: Tolco Incorporated, Corona, Calif.

[21] Appl. No.: 09/353,417

[22] Filed: Jul. 15, 1999

[51] Int. Cl.⁷ ..................................................... A47B 96/06
[52] U.S. Cl. .......................................... 248/228.6; 248/72
[58] Field of Search .............................. 248/228.6, 228.1, 248/229.15, 230.6, 231.71, 72, 58, 62

[56] References Cited

U.S. PATENT DOCUMENTS 5,009,386  4/1991  Berger et al. .......................... 248/62 X

*Primary Examiner*—Ramon O. Ramirez
*Attorney, Agent, or Firm*—Knobbe, Martens, Olson, & Bear, LLP

[57] ABSTRACT

The invention relates to a clamp for firmly connecting to a bar joist flange and other flanged structures, and a method for manufacturing the clamp. The clamp includes one or more yokes and a locking bar that is captured within the yoke(s) by a pair of set screws which also engage the flange. The side walls of the yoke(s) include aligned slots for receiving the flange and aligned openings for receiving the locking bar. In one form, the clamp includes one yoke with openings through an end wall for the set screws. In another form, the yoke side members are U-shaped and the set screws extend between the inner and outer side walls of each side member. In yet another form, the set screws extend between the side walls of an inner yoke and the side walls of an outer yoke of the clamp. The clamp of the invention can be used for bracing pipes and other loads, suspended below ceilings and floors, against sway and seismic disturbances.

41 Claims, 11 Drawing Sheets

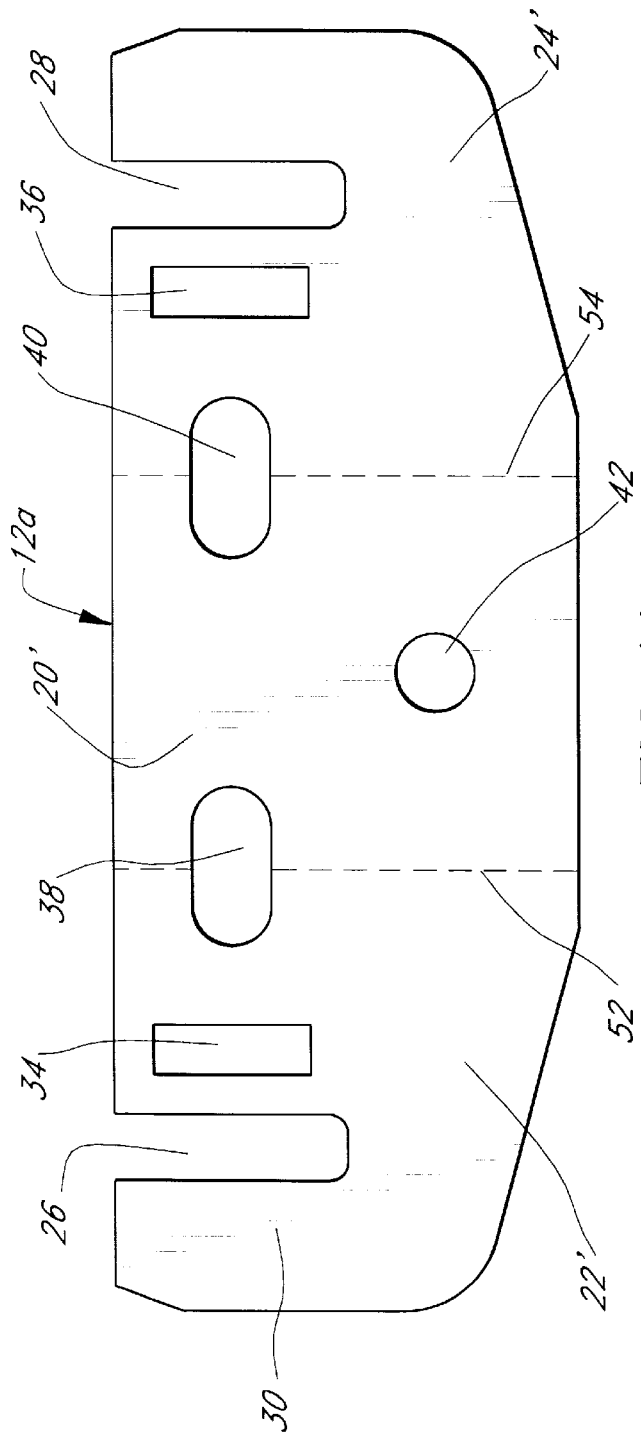
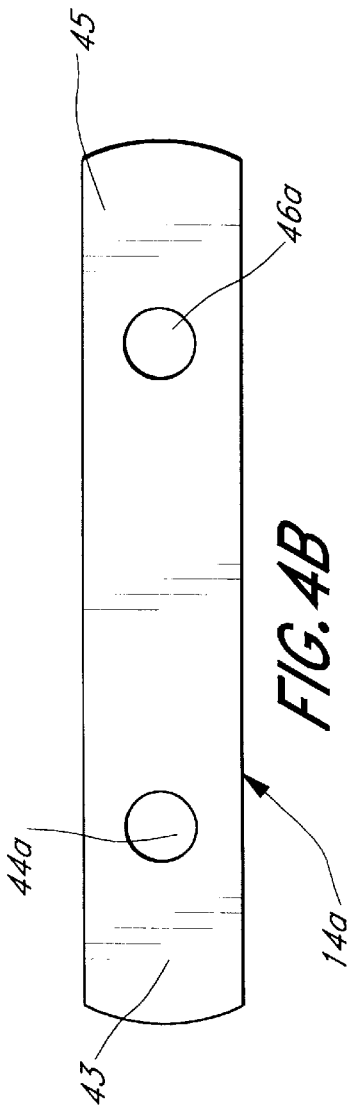

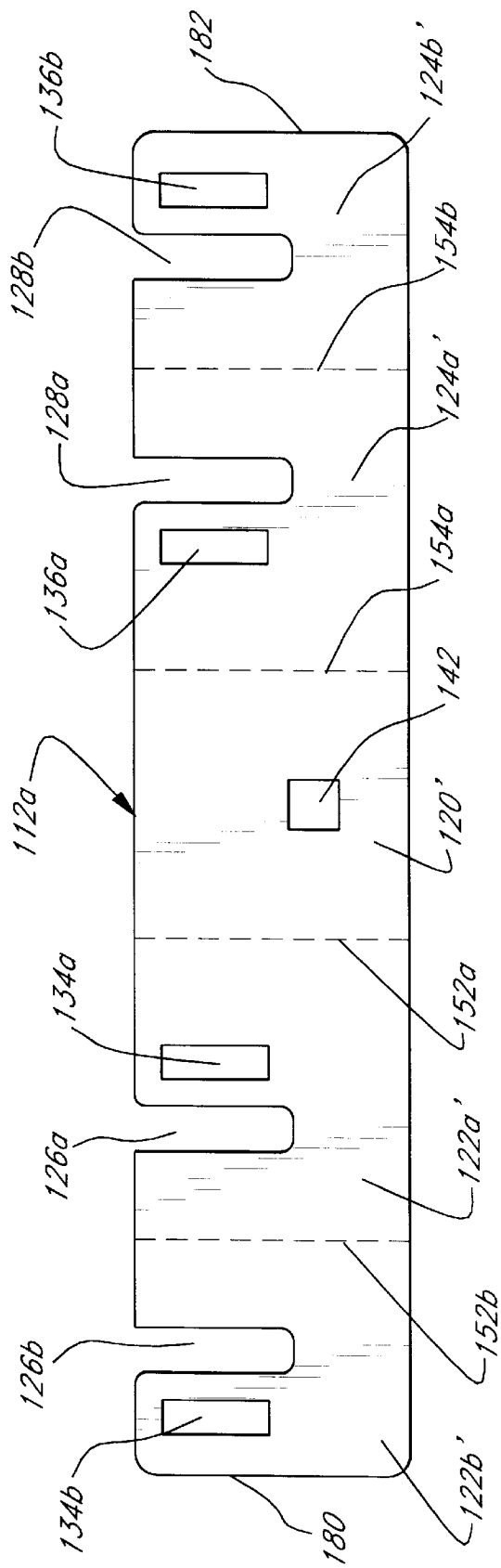
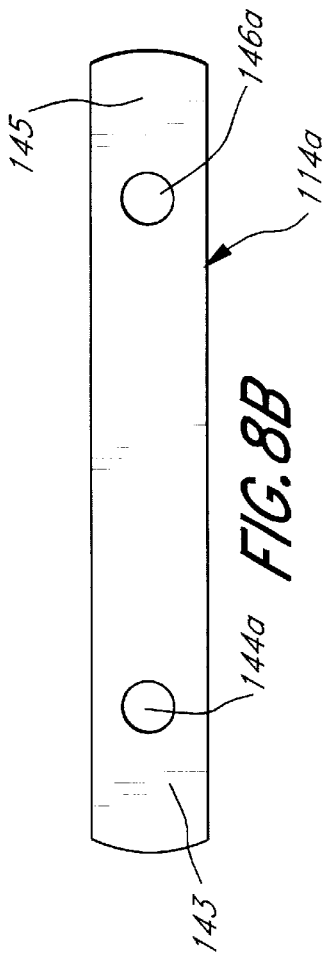
FIG.8A
FIG.8B

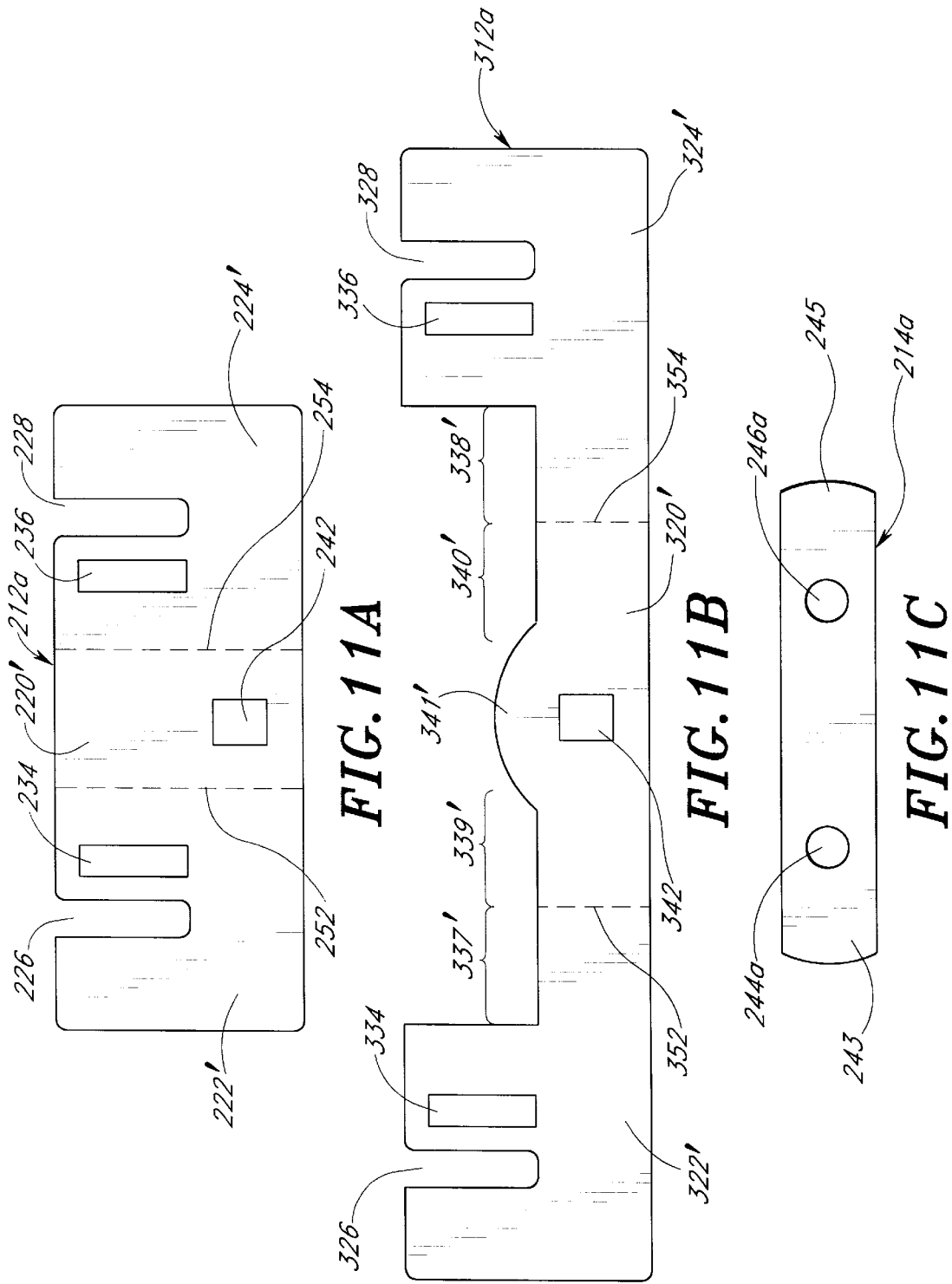

BAR JOIST CLAMP WITH LOCKING BAR

BACKGROUND OF THE INVENTION

1. Field of the Invention

The present invention relates to devices for bracing pipes and other loads, suspended below floors and ceilings, against sway and seismic disturbances, and, in particular, to a bar joist clamp for firmly gripping a building support, such as a bar joist, and other flanged structures.

2. Background of the Related Art

There is a multitude of products in the market utilized by building and plumbing contractors for bracing and supporting pipes, ducts, sprinkler systems, fans, air-conditioners and other loads below floors and ceilings. These products include clamps, braces, hooks, straps, plates, brackets, among other items. Typically, one end of a brace is attached to the load while the top end is attached to a beam on a floor or a ceiling. In many instances, a floor or ceiling is resting on a parallel arrangement of building supports, such as bar joists. A bar joist generally comprises two pairs of spaced angle irons with each pair being coupled to one another by a generally triangular arrangement of tubular struts or arms. The floor or ceiling rests on the horizontal flanges of the top angle iron pair while the arms originate in the space between the inner vertical flanges. The bottom angle iron pair is essentially a mirror image of the top.

It is usually difficult to firmly and reliably place a strong clamp, for attachment to the top end of the brace, on the top angle iron pair of the bar joist since the horizontal flanges are inaccessible for clamping and the vertical flanges are generally fairly closely spaced. Though the horizontal flanges of the bottom angle iron pair of the bar joist present a convenient clamping surface it is usually not desirable to support heavy loads from the bottom angle iron pair. In the prior art, typically, a stud is welded to one of the flanges of the top angle iron pair of the bar joist. The brace is then attached to the welded stud using a combination of appropriate attachment components. The stud welding is time consuming, requires a trained professional and the use of welding equipment, all of which undesirably add to the cost. Additionally and disadvantageously, the stud welding usually requires a precise predetermination of the positioning of the stud and does not permit any flexibility in adjustment of the welded stud's location, thereby possibly requiring repetitive welding, and hence resulting in wasteful expenditure.

Thus, there is a need for a bar joist clamp which can not only withstand substantial loads, but is also simply and expeditiously installable and adjustable, and is preferably economical to manufacture, thereby being desirably inexpensive in cost and in use.

SUMMARY OF THE INVENTION

A bar joist clamp constructed in accordance with the present invention overcomes the aforenoted disadvantages by incorporating one or more yokes with a locking bar and one or more set screws or other means for firmly connecting the clamp to a flange, such as that formed on a bar joist. The bar joist clamp is part of a bracing system which is used to prevent swaying of pipes and other loads suspended below ceilings and floors. The clamp firmly grips a flange and is, typically, attached to one end of a brace while the other end of the brace is connected to the load.

One Embodiment

In accordance with one embodiment of the present invention a clamp comprising a yoke, a locking bar and a pair of set screws is provided. The yoke has a general U-shape with an end wall and a pair of spaced side walls joined to the end wall. Each side wall has a slot, and the slots are preferably aligned with one another to receive a flange of a bar joist or other structure. Each side wall supports the locking bar such as by having an opening, configured to receive an end of the locking bar. A respective one of the openings is situated between a respective one of the slots and the end wall. The bar has one or more threaded holes such as a pair of spaced threaded holes that respectively lie adjacent to the yoke side walls.

The set screws, with each extending through a hole in the yoke end wall, threadably engage the threaded holes in the locking bar, thereby capturing the locking bar within the yoke side walls. The set screws have sufficient length to engage a flange residing in the side wall slots, so as to firmly connect the clamp to the flange. Advantageously, this preferred embodiment permits the clamp to withstand substantially heavy loads which is at least partially due to the support provided, by the yoke, against buckling and bending of the bar. The yoke end wall preferably has a pin receiving aperture spaced from the end wall set screw holes such that the aperture is spaced midway between the holes and offset with respect to them to define a generally triangular relationship.

The clamp of the present invention may be manufactured by machining, casting or forging but a preferred method of manufacturing the clamp includes stamping flat strips of metal plate. A strip of metal plate is stamped into a generally rectangular piece with a central end wall and a pair of side walls. The stamping includes punching a pair of elongated slots and a pair of closed openings in the side walls such that a respective one of the openings is situated between a respective one of the slots and the end wall. The stamping further includes punching a pair of holes through the end wall and preferably punching an aperture in the end wall. The side walls are then bent approximately 90° with respect to the end wall to create a generally U-shaped yoke.

The method further includes the step of stamping a strip of metal plate into a generally rectangular bar sized and configured to fit within the closed openings of the yoke side walls. The stamping includes punching a pair of holes through the bar spaced by a distance approximately equal to the spacing between the pair of holes of the yoke. The holes in the bar are threaded to create a locking bar. The locking bar is inserted into the closed openings in the yoke side walls and the bar threaded holes are aligned with the holes of the yoke. A set screw is inserted through each of the yoke holes and threaded into each of the threaded holes of the locking bar, thereby capturing the bar in the yoke to form a clamp. Advantageously, this preferred method of manufacturing the clamp is especially suited for automated assembly lines, wherein the simplicity and speed of the manufacturing process produces a desirably inexpensive end-product.

Another Embodiment

In accordance with another embodiment of the present invention a clamp comprising a yoke, a locking bar and a pair of set screws is provided. The yoke has a generally U-shaped portion, with an end wall and a pair of flat spaced, inner side walls joined to the end wall. The side walls are further joined to a pair of generally J-shaped portions each having a side wall adjacently spaced from a respective one of said U-shaped portion side walls. The inner side walls and the J-shaped portions essentially form respective U-shaped wall members having spaced inner and outer side walls. Each side wall has a slot and the slots are preferably aligned with one another to receive a flange. Each side wall has an opening, and the openings are preferably aligned with one another to receive the locking bar so that the ends of the locking bar are received in the outer side wall openings. A respective one of the inner side wall openings is situated between a respective one of the inner side wall slots and said end wall. Preferably, the end wall has a pin receiving aperture spaced midway between the U-shaped portion side walls and below the slots.

The locking bar has a pair of spaced threaded holes. When the bar is positioned in the yoke, a respective one of the bar threaded holes is located between the inner and outer walls of a respective one of the U-shaped side wall members. The pair of set screws threadably engage the threaded holes in the locking bar. The diameter of the threaded portions of the respective set screws is slightly smaller than the spacing between respective inner and outer side walls. This substantially restricts displacement of the bar, thereby capturing the locking bar within the yoke side walls. The set screws have sufficient length to engage a flange residing in the side wall slots, so as to firmly connect the clamp to the flange. Advantageously, this preferred embodiment permits the clamp to withstand substantially heavy loads which is at least partially due to the support provided, by the yoke, against buckling and bending of the bar. That is, the bar engages a pair of inner and outer side walls so that the load applied to a set screw is balanced between the adjacent side walls.

The clamp of this second embodiment may be manufactured by machining, casting or forging but a preferred method of manufacturing the clamp includes stamping flat strips of metal plate. A strip of metal plate is stamped into a generally rectangular piece with a central end wall flanked by a pair of inner side walls, adjacent to respective outer side walls. The stamping includes punching an elongated slot and a closed opening in each of the yoke side walls, such that the side wall slots of respective inner and outer walls are placed between the openings of respective inner and outer walls. The stamping preferably further includes punching an aperture in the end wall spaced midway between the inner side wall openings and offset with respect to the inner wall openings to define a generally triangular relationship. The inner side walls are bent approximately 90° with respect to the end wall and the outer side walls are bent approximately 180° with respect to the inner side walls, respectively. This creates a yoke having a generally U-shape, including the end wall with generally U-shaped side members having an inner and outer side walls, such that all the slots are substantially aligned with one another and all the openings are substantially aligned with one another.

The method further includes the step of stamping a strip of metal plate into a generally rectangular bar sized and configured to fit within the openings of the yoke side walls. The stamping includes punching a pair of holes through the bar that are then threaded to create a locking bar. The locking bar is inserted into the openings of the yoke with the bar holes being aligned so that respective one of the bar threaded holes is positioned between adjacent inner and outer side walls. A set screw is threaded into each of the threaded holes of the locking bar.

Preferably, the threaded portions of the set screws have a diameter slightly smaller than the spacing between adjacent inner and outer side walls, thereby substantially restricting displacement of the bar and capturing the bar in the yoke to form a clamp. Advantageously, this preferred method of manufacturing the clamp is especially suited for automated assembly lines, wherein the simplicity and speed of the manufacturing process produces a desirably inexpensive end-product.

A Further Embodiment

In accordance with a further embodiment of the present invention, a clamp comprising an inner yoke, an outer yoke, a locking bar and a pair of set screws is provided. The inner yoke has a general U-shape with an end wall and a pair of spaced side walls joined to the end wall. Each inner yoke side wall has a slot, and the slots are preferably aligned with one another to receive a flange of a bar joist or other structure. Each inner yoke side wall supports the locking bar such as by having an opening, configured to receive the locking bar. A respective one of the inner yoke openings is situated between a respective one of the inner yoke slots and the inner yoke end wall. In one form of the invention, the inner yoke side walls have sections, adjacent to the inner yoke end wall, with reduced height to allow clearance space for the screws. Preferably, the inner yoke end wall has a pin receiving aperture spaced midway between the inner yoke side walls and below the inner yoke slots.

The outer yoke generally circumscribes the inner yoke and has a general U-shape with an end wall and a pair of spaced side walls joined to the end wall. The outer yoke side walls are spaced from respective inner yoke side walls to provide gaps for receiving the screws. Each outer yoke side wall has a slot, and the slots are preferably aligned with one another and with the inner yoke slots to receive a flange of a bar joist or other structure. Each outer yoke side wall, along with the inner yoke side walls, supports the locking bar such as by having an opening, configured to receive the ends of the locking bar. A respective one of the outer yoke openings is situated between a respective one of the outer yoke slots and the outer yoke end wall. Preferably, the outer yoke end wall has a pin receiving aperture spaced midway between the outer yoke side walls and below the outer yoke slots. The outer yoke end wall further includes sections with reduced height to allow the set screws to engage the locking bar. The outer yoke end wall lowered sections are adjacent to respective side wall lowered sections and flank a generally hump shaped central portion of the end wall.

The locking bar has a pair of spaced threaded holes. When the bar is positioned in the inner and outer yokes the bar threaded holes are located between adjacent inner and outer yoke side walls. The pair of set screws threadably engage the threaded holes in the locking bar. The diameter of the threaded portions of the respective set screws is slightly smaller than the spacing between adjacent inner and outer yoke side walls. This substantially restricts displacement of the bar, thereby capturing the locking bar within the side walls of the two yokes. The set screws have sufficient length to engage a flange residing in the inner and outer yoke slots, so as to firmly connect the clamp to the flange. Advantageously, this preferred embodiment permits the clamp to withstand substantially heavy loads which is at least partially due to the support provided, by the yokes, against buckling and bending of the bar. That is, the bar engages a pair of inner and outer yoke side walls so that the load applied to a set screw is balanced between the adjacent inner and outer yoke side walls.

The clamp of this third embodiment may be manufactured by machining, casting or forging but a preferred method of manufacturing the clamp includes stamping flat strips of metal plate. A strip of metal plate is stamped into a generally rectangular first piece with a central end wall and a pair of side walls. The stamping includes punching a pair of elongated slots and a pair of closed openings in the first piece side walls such that a respective one of the first piece openings is situated between a respective one of the first piece slots and the first piece end wall. The stamping further includes punching an aperture in the first piece end wall. The first piece side walls are then bent approximately 90° with respect to the first piece end wall to create a generally U-shaped inner yoke.

The method also includes the step of stamping a strip of metal plate into a generally U-shaped second piece with a central end wall and a pair of side walls. The stamping includes punching a pair of elongated slots and a pair of closed openings in the second piece side walls such that a respective one of the second piece openings is situated between a respective one of the second piece slots and the second piece end wall. The stamping further includes punching an aperture in the second piece end wall. The second piece side walls are then bent approximately 90° with respect to the second piece end wall to create a generally U-shaped outer yoke.

The method further includes the step of stamping a strip of metal plate into a generally rectangular third piece sized and configured to fit within the inner yoke openings and the outer yoke openings. The stamping includes punching a pair of holes through the third piece that are spaced by a distance greater than the spacing between the inner yoke side walls and less than the spacing between the outer yoke side walls. The holes are then threaded to create a locking bar.

The inner yoke and the outer yoke are then aligned so that the inner yoke slots are aligned with the outer yoke slots, the inner yoke openings are aligned with the outer yoke openings, and the inner yoke aperture is aligned with the outer yoke aperture. The locking bar is inserted into the openings of the inner and outer yokes so that the locking bar threaded holes are located between adjacent inner and outer yoke side walls. A set screw is threaded into each of the threaded holes.

Preferably, the threaded portions of the set screws have a diameter slightly smaller than the spacing between adjacent inner and outer yoke side walls, thereby substantially restricting displacement of the bar and capturing the bar in the yokes to form a clamp. Advantageously, this preferred method of manufacturing the clamp is especially suited for automated assembly lines, wherein the simplicity and speed of the manufacturing process produces a desirably inexpensive end-product.

Advantageously, the clamp of the present invention can not only withstand substantially heavy loads and is economical to manufacture, but it can also be used to support and/or suspend a wide variety of loads below ceilings and floors and further it is adaptable to basically any flanged structure, for example, I-beams, H-beams, channels and plates among others.

For purposes of summarizing the invention and the advantages achieved over the prior art, certain objects and advantages of the invention have been described herein above. Of course, it is to be understood that not necessarily all such objects and advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 4A illustrates a step during manufacture of one of the bar joist clamps of FIG. 1;

FIG. 4B illustrates another step during manufacture of one of the bar joist clamps of FIG. 1;

FIG. 8A illustrates a step during manufacture of the bar joist clamp of FIG. 6;

FIG. 8B illustrates another step during manufacture of the bar joist clamp of FIG. 6;

FIG. 11A illustrates a step during manufacture of the bar joist clamp of FIG. 9;

FIG. 11B illustrates another step during manufacture of the bar joist clamp of FIG. 9; and FIG. 11C illustrates a further step during manufacture of the bar joist clamp of FIG. 9.

DETAILED DESCRIPTION OF THE PREFERRED EMBODIMENTS

One Embodiment

Figure 1:
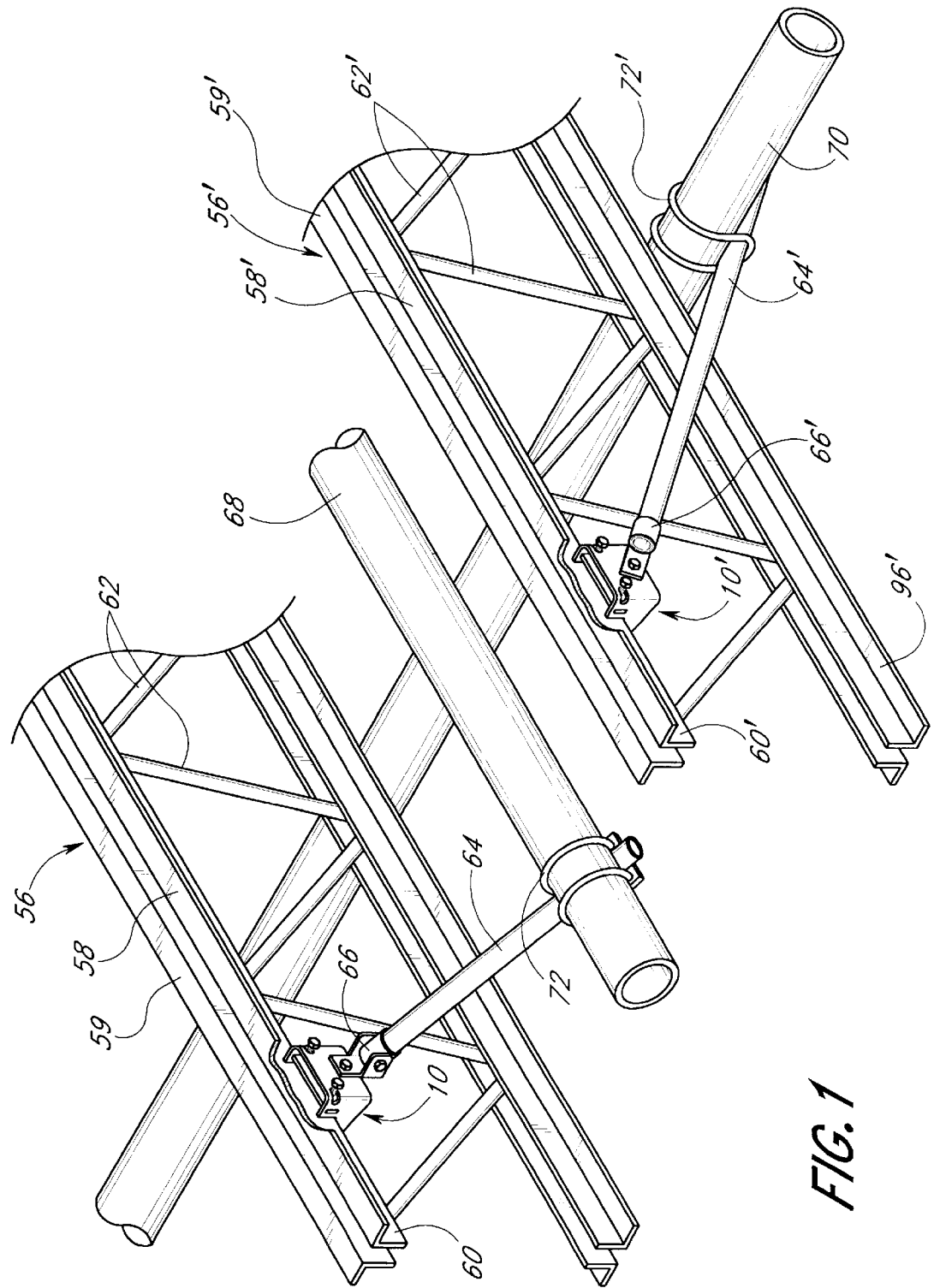
FIG. 1 illustrates two clamps in accordance with one embodiment of the present invention mounted to bar joists, wherein one of each bar joist clamp is used to support, respectively, a parallely and a perpendicularly oriented pipe.
Figure 2:
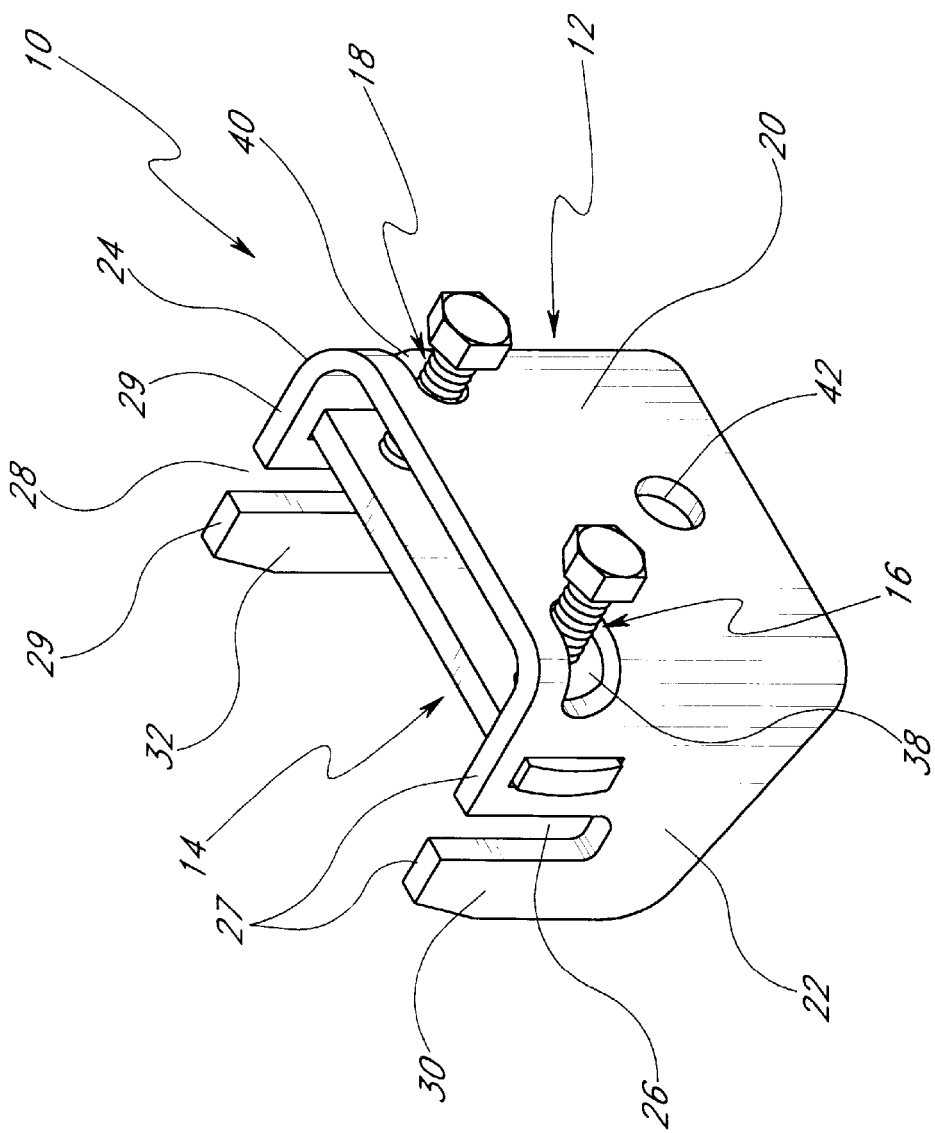
FIG. 2 view of one of the bar joist clamps of FIG. 1.
Figure 3:
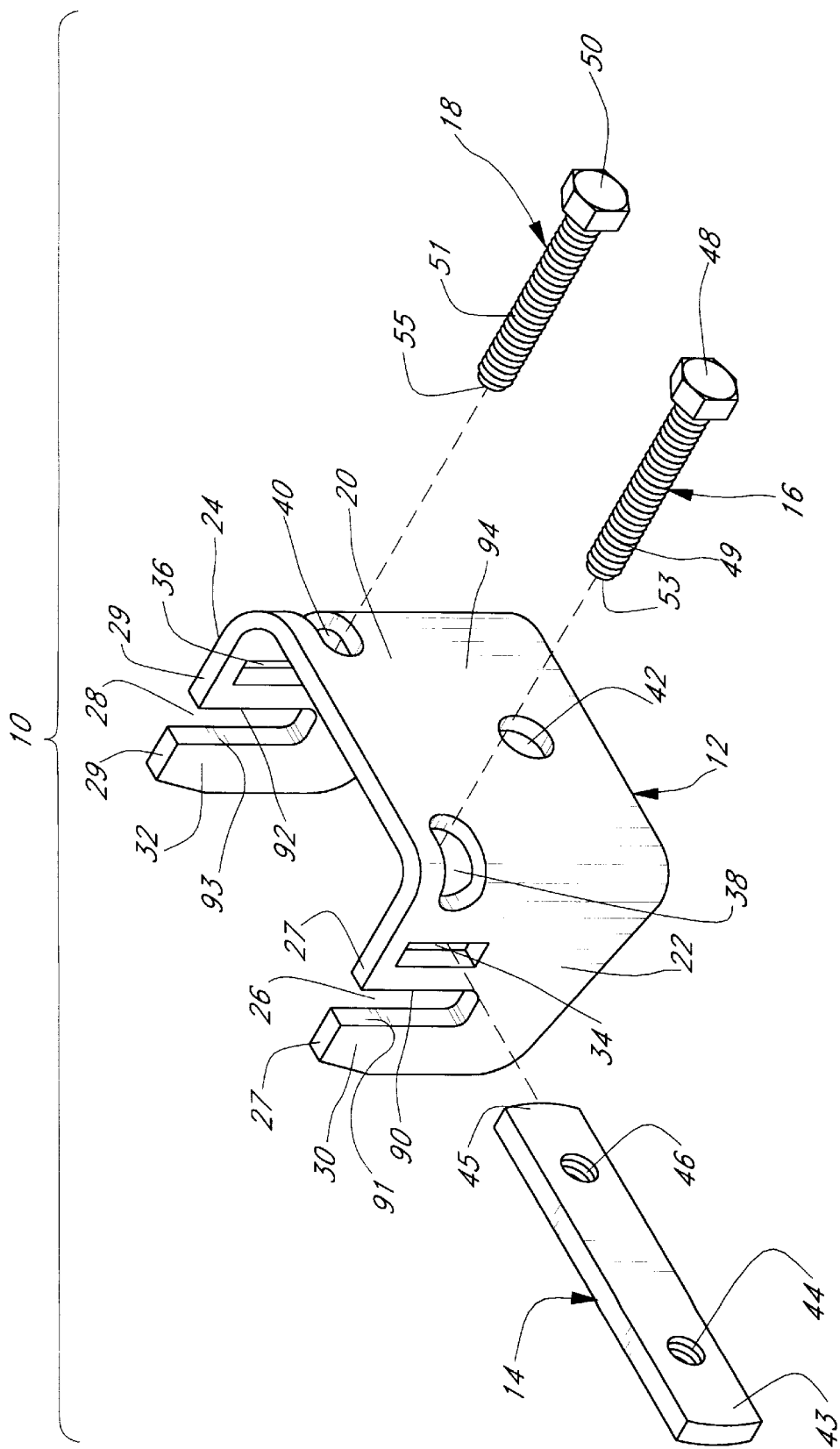
FIG. 3 is an exploded perspective view of one of the bar joist clamps of FIG. 1.

FIGS. 1 to 3 show one embodiment of a bar joist clamp 10 constructed and assembled in accordance with the teachings of the invention. FIG. 1 illustrates two identical clamps 10 and 10', in accordance with one embodiment of the invention, mounted to bar joists 56 and 56', and used to support, respectively, a substantially parallely oriented pipe 68 and a substantially perpendicularly oriented pipe 70. The clamp 10 comprises a yoke 12, a locking or lock bar 14 and a pair of set screws 16 and 18, which can firmly connect the clamp 10 to a top vertical flange 60 of the bar joist 56 or to other flanges.

As best shown in FIGS. 2 and 3, the yoke 12 is generally U-shaped and includes a flat end wall 20 and a pair of spaced side walls 22 and 24 joined to the end wall 20. The first side wall 22 has an elongated first slot 26 extending through an edge 27 of the first side wall 22. This forms an ear 30 at the free end of the side wall 22. Similarly, the second side wall 24 has an elongated slot 28, forming an ear 32, and extending from a closed end to an open end at an edge 29 of the second side wall 24. The slots 26 and 28 are aligned and open in the same direction to receive a flange, for example as shown in FIG. 1, the top vertical flange 60 of the bar joist 56. Preferably, the slots 26, 28 are generally rectangular in shape. The side walls 22 and 24 each have a respective opening 34 and 36 spaced between the end wall 20 and the respective slots 26 and 28. Preferably, the openings 34 and 36 are aligned and shaped to receive the bar 14, and are generally rectangular in shape. The end wall 20 has a pair of holes 38, 40 which are preferably aligned with the respective side wall openings 34, 36. Preferably, the end wall 20 has an aperture 42 which is spaced midway between the holes 38 and 40, and offset with respect to the holes 38 and 40 to define a generally triangular relationship. The aperture 42 is substantially circular in shape to receive a bolt, pin or other element for connection to a brace or fitting to support a load. The aperture may be alternately shaped with efficacy, as needed or desired.

The locking bar 14 (see FIGS. 2 and 3) is generally elongated and rectangular with one end 43 positioned in the opening 34 of the side wall 22, and a second end 45 positioned in the opening 36 of the side wall 24. The ends 43, 45 have a generally rectangular perimeter. The bar 14 is in a generally perpendicular relation to the side walls 22, 24. The bar 14 has a pair of threaded holes 44 and 46 adjacent to the side walls 22 and 24, respectively, and are aligned with the holes 38 and 40, respectively, when the bar 14 is positioned in the yoke 12.

Preferably, the yoke 12 and the locking bar 14 are fabricated from hot-rolled low-carbon steel to meet the standards set by the Underwriters Laboratories (U.L.), Factory Mutual Engineering (F.M.), and other such quality control groups, though other suitable materials may also be used. Additionally, the yoke 12 and the locking bar 14 may have a plain or electro-galvanized finish.

Referring to FIGS. 2 and 3, the set screws 16 and 18 have respective heads 48, 50 and respective threaded portions 49, 51. The set screws 16 and 18 extend through the holes 38 and 40, respectively, and are threaded into the holes 44 and 46 of the locking bar 14, thereby capturing the bar 14 within the yoke side walls 22, 24. The set screws 16, 18 are long enough to be threaded through the locking bar 14 to engage a flange positioned in the slots 26, 28. Preferably, the set screws 16 and 18 have cup points 53 and 55, respectively, for engaging a flange, such as the flange 60 shown in FIG. 1. Alternatively, the set screws 16 and 18 may employ cone points, if needed or desired. Also, as required or desired, the screw heads 48, 50 can be adapted to break off at a predetermined torque level.

In the preferred embodiment which is illustrated in FIGS. 1 to 3, the yoke 12 is about 0.25 inches thick. The overall peak dimensions of the yoke 12 are about 3 inches high, 3.1 inches wide, and 2.9 inches long. The end wall 20 is preferably about 3 inches high and spaces the inner surfaces of the side walls 22 and 24 by about 2.5 inches. The side walls 22 and 24 preferably have a peak height of about 3 inches. The slots 26 and 28 have dimensions of about 0.4 inches×1.5 inches, and the distance between their respective edges 90, 92, adjacent to the respective openings 34, 36, and the outer surface 94 of the end wall 20 is approximately 1.6 inches. The ears 30, 32 have a width of about 0.8 inches. The openings 34, 36 have dimensions of about 0.325 inches× 1.02 inch. The centers of the openings 34, 36 are about 0.75 inches below the edges 27, 29 respectively, and spaced by about 1.2 inches from the outer surface 94 of the end wall 20. The holes 38, 40 are disposed at a height of about 2.25 inches, and the aperture 42, which has a diameter of about 0.5 inches, is laterally centered on the end wall 20 at a distance of about 1.25 inches below the holes 38, 40. Of course, those skilled in the art will recognize that these and other dimensions presented herein are illustrative of one preferred embodiment, and that the present invention may be alternatively dimensioned with efficacy, as required or desired.

Preferably, the bar 14 (see FIGS. 2 and 3) is about 0.31 inches thick and about 1 inch high which permits it to fit comfortably in the approximately 0.325 inches×1.01 inches dimensioned openings 34 and 36. Also, the length of the bar 14 is about 3.25 inches so that its ends 43, 45 slightly extend out of the openings 34 and 36 when the bar 14 is placed in the yoke 12. The spacing between the threaded holes 44 and 46 is preferably about 2 inches which disposes them in substantial alignment with the holes 38 and 40, respectively. The threaded holes 44, 46 comprise standard ½-inch female threads.

Preferably, and referring to FIGS. 2 and 3, the threaded portions 49 and 51 of the set screws 16 and 18, respectively, comprise standard ½-inch threads. The threaded portions 49 and 51 are preferably about 2 inches in length, so that the respective cup points 53, 55 can extend beyond the respective slots 26 and 28. Preferably, the set screws 16 and 18 are fabricated from a hardened carbon steel, though other suitable materials may be used with efficacy.

The present invention also prescribes a method for attaching the clamp 10 to a flange. The method begins with the step of sliding slots 26 and 28 of the clamp 10 over the flange, for example, the top vertical flange 60 of the bar joist 56, as shown in FIG. 1. Set screws 16 and 18 are inserted through respective holes 38 and 40 in the yoke 12 and threaded into holes 44 and 46 in the locking bar 14 until cup points 53 and 55 of the set screws make contact with the flange 60. The set screws 16 and 18 are tightened, using, for example, a torque wrench (not shown), until their heads 48 and 50, respectively, break off, whereby the set screws 16 and 18 securely contact the flange 60. This procedure results in the clamp 10 being firmly attached to the flange 60.

Thus, it can be seen that the set screws 16, 18 comprise means extending between the bar 14 and the flange 60 that connect the clamp 10 to the flange 60. If desired, means other than set screws may be employed to provide the necessary function. For example, this means can comprise a suitable wedge, such as a spring-loaded and/or cammed member, operable via a lever or the like and extending between the bar 14 and the flange 60. The means reacts against the bar 14 and presses the flange 60 against the portions of the side walls 22, 24 forming respective edges 91, 93 of the respective slots 26, 28.

In use, once the clamp 10 and the identical clamp 10', as shown in FIG. 1, have been attached to bar joists 56 and 56', respectively, they may be used to support loads, for example, pipes 68 and 70, respectively. The bar joists 56 and 56' may either support a floor or a ceiling with the floor or ceiling resting on the top horizontal flanges of the bar joists 56 and 56'. The top vertical flange 60 is part of the angle iron 58 which in turn is one of the pair of top angle irons 58, 59 of the bar joist 56. Advantageously, and referring to FIGS. 1 to 3, the ears 30 and 32 of the clamp 10 are dimensioned to conveniently fit in the gap created by tubular struts or arms 62 between the angle iron pairs of conventional bar joists, for example, the gap between the angle irons 58 and 59 of the bar joist 56. Additionally, the slots 26 and 28 are dimensioned to easily slip over the flange 60 of the bar joist 56. The same applies to the identical clamp 10' shown in FIG. 1.

The bar joist clamp 10 (see FIGS. 1 to 3) is capable of supporting substantially large loads. This is, in part, due to the availability of the two openings 34 and 36 in which the locking bar 14 resides and the two slots 26 and 28 in which the flange resides. In this manner, the load is not only distributed over the body of the yoke 12 but the locking bar 14 is also supported at two locations by the yoke 12 which resists bending and buckling of the bar 14. Advantageously, the placement of the set screws 16 and 18 ensures that the regions of high stress concentrations on the locking bar 14 are adjacent to support provided by the side walls of the yoke. Additionally, the particular materials and dimensions used in the construction of the clamp 10 further add to its ability to support substantially heavy loads.

The clamp 10 of FIG. 1 illustrates one preferred way of supporting a pipe 68 which is oriented substantially parallel to the bar joist 56. A fitting 66 is attached to the lamp 10 by engaging the aperture 42 of the end wall 20 of the yoke 12. The fitting is also coupled to one end of a bracing pipe 64 which has its other end connected to a pipe 68 by means of a clamping device 72. Those skilled in the art will readily recognize that suitable fittings other than the fitting 66 and braces other than the bracing pipe 64 may also be employed with efficacy in conjunction with the clamp 10. Of course, more than one clamp 10 will usually be required, at locations along the bar joist 56, to support the pipe 68 along its length. The number of clamps needed and, hence, their spacing is dependent on the size and weight of the pipe to be supported. Moreover, the clamp 10 can also be used to support ducts, sprinkler systems, fans, air-conditioners and other loads which are mounted below floors and ceilings.

One aspect of the versatility of the present invention is illustrated in FIG. 1, wherein the clamp 10', which is identical to clamp 10, is used to support a pipe 70 which is substantially perpendicular to the bar joist 56'. Advantageously, and referring to FIG. 3, the distance of about 1.6 inches between the edges 90 and 92 of the slots 26 and 28 and the outer surface 94 of the end wall 20 permits the end wall 20 of the clamp 10' to extend beyond the horizontal flanges, and more specifically for the illustration in FIG. 1 beyond the lower horizontal flange 96' of the bar joist 56'. This allows a bracing pipe 64' to be secured by a fitting 66' to the clamp 10' such that the bracing pipe 64' extends downwards in a plane that is substantially parallel to the bar joist 56'. In this manner the clamp 10' can support a pipe 70 that is oriented substantially perpendicular to the bar joist 56'. It should be noted that the openings 34 and 36 are closer to the slots 26 and 28 than to the end wall 20. This enhances the stability of the connection between the set screws 16 and 18 and the flange 60, while enabling the end wall 20 to extend beyond the flange 96'.

Though FIG. 1 illustrates the clamps 10 and 10' attached to respective vertical flanges 60 and 60' of respective bar joists 56 and 56', those of ordinary skill in the art will readily recognize that the clamp of the present invention can be mounted on a variety of structures. For example, the clamp 10 may be attached to I-beams, H-beams, channels, plates, other flanged structures and the like. This versatility, advantageously, further adds to the modularity of the clamp 10.

The bar joist clamp 10 of the present invention may be manufactured by machining, casting or forging, but a preferred method of manufacturing the clamp 10 includes stamping flat strips of metal plate. Referring to FIG. 4A, a strip of metal plate is stamped into a generally rectangular shaped piece 12*a*. The stamping includes punching a pair of elongated slots 26, 28 in respective side walls 22', 24' of the piece 12*a*. The side walls 22', 24' are spaced by a central end wall 20'. The stamping also includes punching a pair of spaced closed openings 34, 36 in a respective one of the side walls 22', 24' between a respective one of the slots 26, 28 and the end wall 20'. The stamping further includes punching a pair of holes 38 and 40 which are situated at respective junctions (lines) 52, 54 between the end wall 20' and the respective side walls 22', 24', and punching an aperture 42 in the end wall 20' spaced midway between the holes 38 and 40 and offset with respect to the holes 38, 40 to define a generally triangular relationship. The side walls 22' and 24' are bent, preferably approximately 90° with respect to the end wall 20', along the lines marked 52 and 54 (shown in FIG. 4A), respectively, to create a generally U-shaped yoke 12 (shown, for example, in FIGS. 2 and 3) with an end wall 20 and side walls 22 and 24.

Referring to FIG. 4B, a strip of metal plate is stamped into a generally rectangular bar 14*a*. The bar 14*a* is sized and configured to fit within the closed openings 34, 36 of the respective yoke side walls 22, 24 (see, for example, FIG. 3). The stamping includes punching a pair of holes 44*a* and 46*a* through the bar 14*a* which are spaced a distance approximately equal to the spacing between the holes 38 and 40 of the yoke 12. The holes 44*a* and 46*a* are threaded to form respective threaded holes 44 and 46, thereby creating a locking bar 14 (shown, for example, in FIG. 3).

Referring to FIGS. 2 and 3, the locking bar 14 is inserted into the closed openings 34, 36 of the respective yoke side walls 22, 24 so that the threaded holes 44, 46 of the bar 14 are aligned with the respective holes 38, 40 of the end wall 20 of the yoke 12. A pair of set screws 16 and 18 are inserted through respective holes 38 and 40 of the yoke 12 and threaded into respective threaded holes 44 and 46 of the locking bar 14, thereby capturing the locking bar 14 in the yoke 12, and hence forming a clamp 10. The set screws 16, 18 are long enough to be threaded through the locking bar 14 to engage a flange, for example, the flange 60 shown in FIG. 1, positioned in the slots 26, 28 so that the clamp 10 can firmly grip the flange.

Referring to FIG. 4A, it should be noted that the elongated holes 38, 40 are punched, advantageously, at the respective junctions 52, 54 so that when the side walls 22', 24' are bent, as shown in FIG. 3, the holes 38, 40 permit the respective set screws 16, 18 to extend through the end wall 20 while being substantially adjacent to the respective side walls 22, 24. Optionally, the holes 38, 40 may be generally circular and punched in the end wall 20' (FIG. 4A), as needed or desired. Also, in alternative manufacturing methods, such as machining, casting or forging, circular holes 38 and 40 may be formed in the end wall 20.

The above-described method is especially suited for automated assembly lines, wherein stamping, punching and bending operations can be efficiently executed. The simplicity and speed of this manufacturing method results in an end-product that is economical to manufacture and, thus is desirably inexpensive. Of course, alternatively, and as mentioned before, the components of the bar joist clamp 10 may be machined but this process is more time consuming and, consequently, more expensive.

Figure 5:
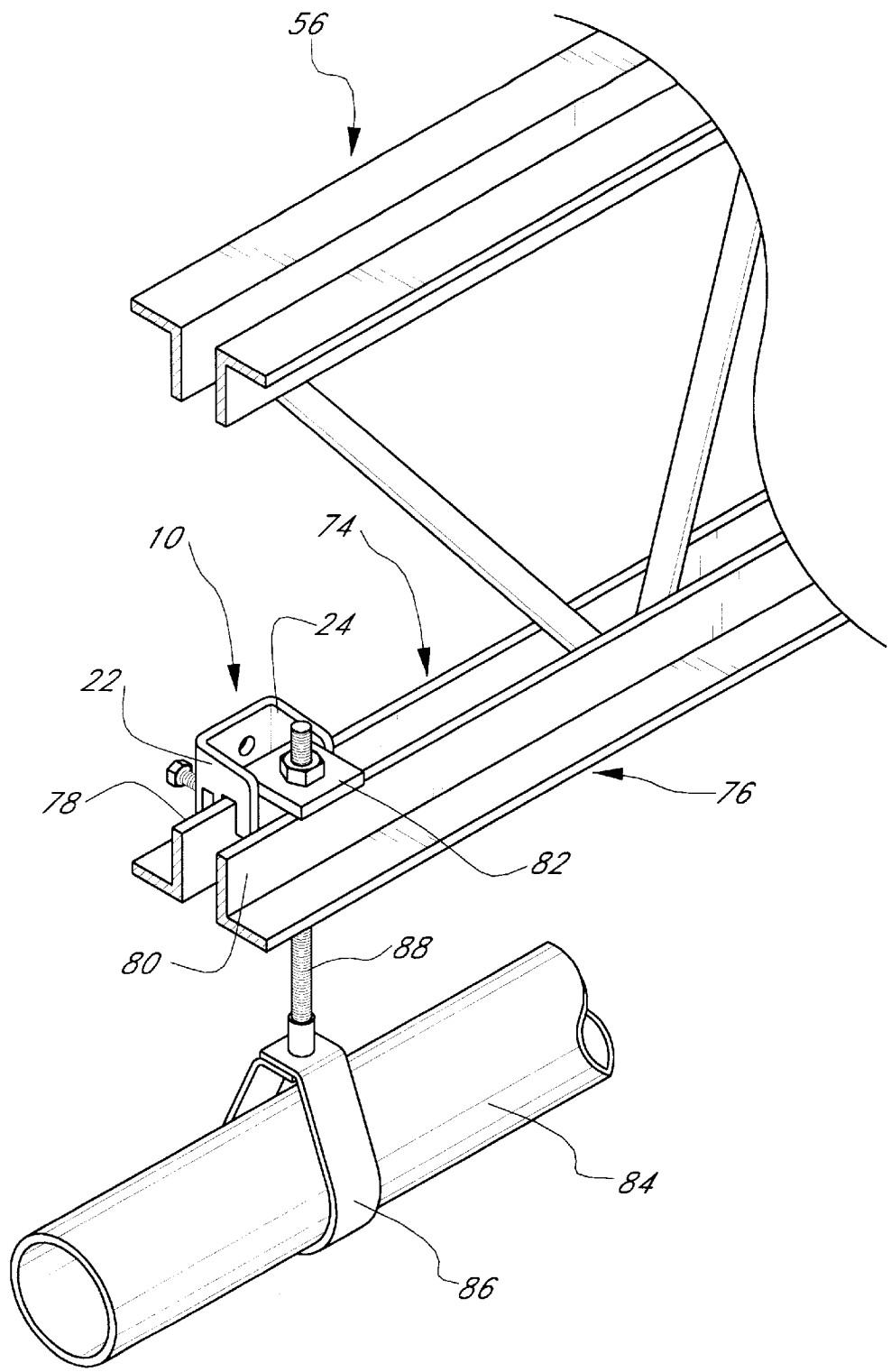
FIG. 5 illustrates an alternative use of one of the bar joist clamps of FIG. 1, wherein a pipe, in parallel alignment with and directly below the bar joist, is suspended.

FIG. 5 illustrates an alternative mode of use for the bar joist clamp 10. A pipe 84 is suspended substantially directly below and substantially parallel to the bar joist 56. A ring hanger 86 connected to a threaded rod 88 with a square washer 82 is used to support the pipe 84 from the lower angle irons 74 and 76 of the bar joist 56, in the manner illustrated in FIG. 5. The washer 82 rests on the top of the vertical flanges 78 and 80 of the respective angle irons 74 and 76. The clamp 10 is mounted on the flange 78 such that the yoke side walls 22 and 24 provide a barrier against undesirable sliding motion of the washer 82 along the top of the vertical flanges 78 and 80. Advantageously, the use of the clamp 10 in such a fashion, as shown in FIG. 5, further illustrates its versatility and adaptability.

Another Embodiment

Figure 6:
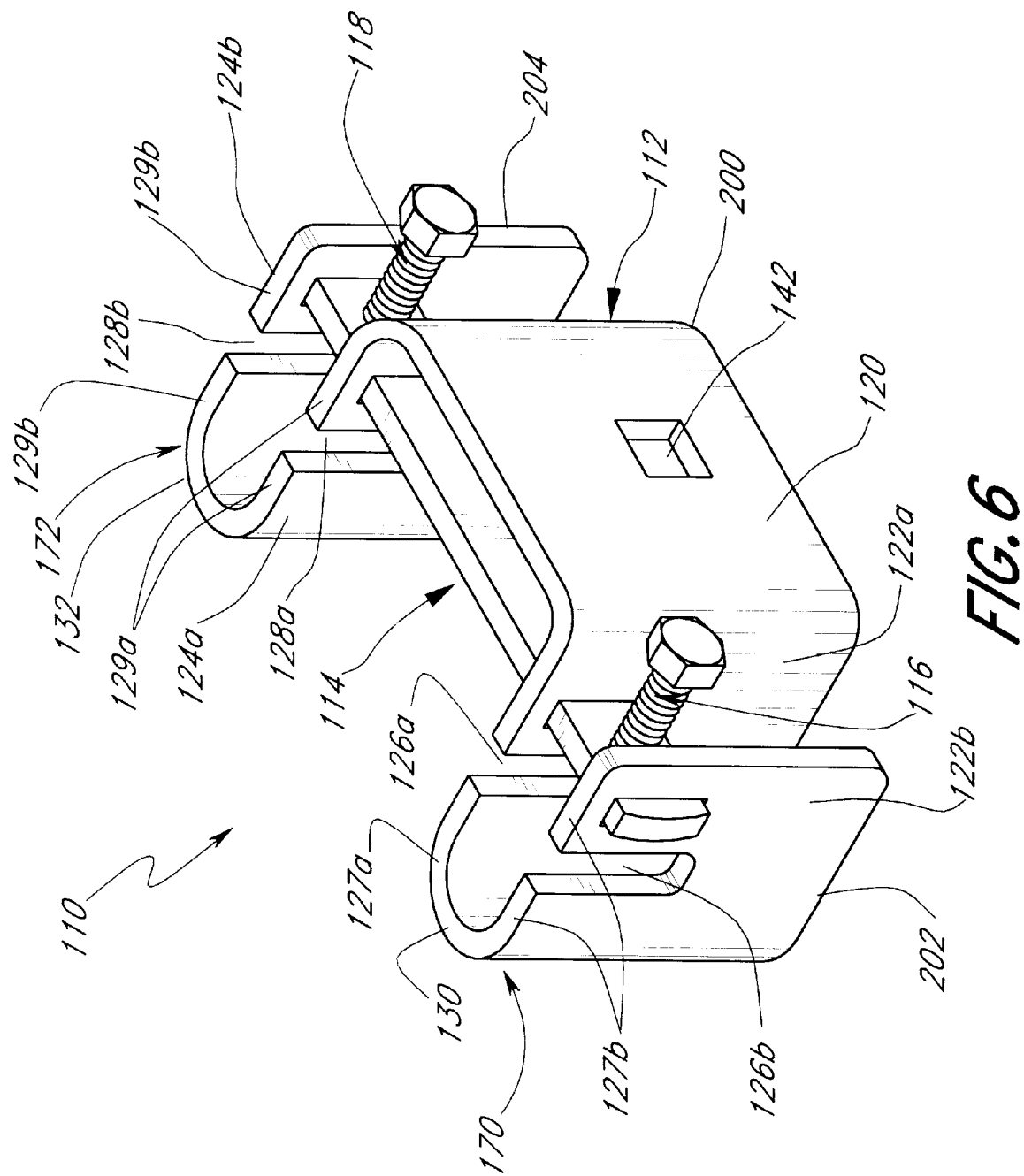
FIG. 6 is a perspective view of another preferred embodiment of a bar joist clamp in accordance with the present invention.
Figure 7:
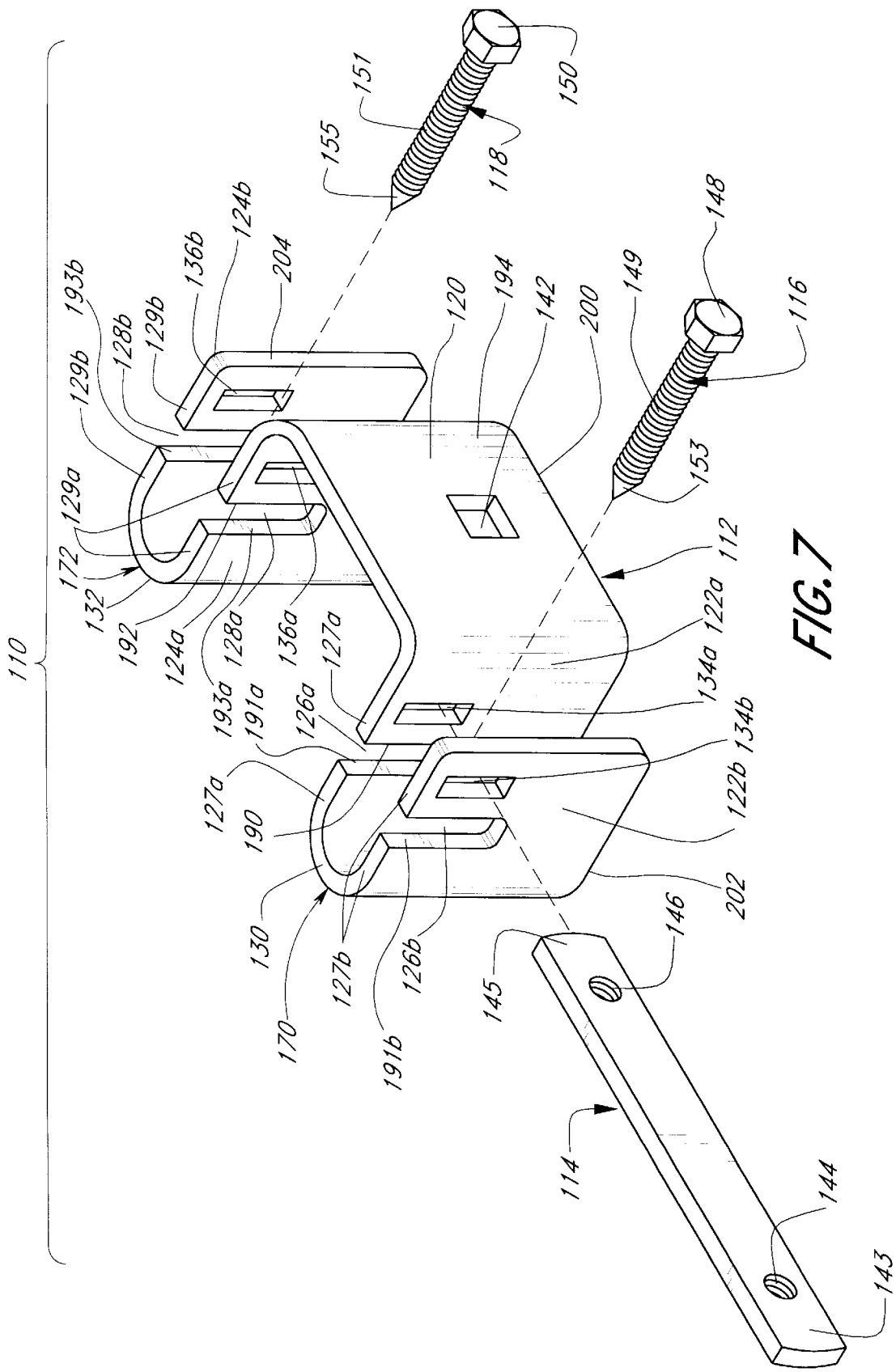
FIG. 7 is an exploded perspective view of the bar joist clamp of FIG. 6.

FIGS. 6 and 7 show another embodiment of a bar joist clamp 110 constructed and assembled in accordance with the invention. FIG. 6 is a perspective view of the bar joist clamp 110 and FIG. 7 is an exploded perspective of the same clamp 110. Preferably, the bar joist clamp 110 comprises a yoke 112, a locking or lock bar 114 and a pair of set screws 116 and 118, which firmly connect the clamp 110 to a flange such as the top vertical flange 60 of the bar joist 56 shown in FIG. 1. Though, for the sake of brevity, the drawings do not show the bar joist clamp 110 in use as a component for supporting a pipe below a bar joist, as shown for the clamps 10 and 10' in FIG. 1, it will be readily apparent to those skilled in the art that the mounting and use the of clamp 110 is similar to that of the clamps 10 and 10' and, hence, does not require further illustration. Thus, the bar joist clamp 110 may be used with efficacy to assist in supporting the substantially parallely oriented pipe 68 (see FIG. 1) or the substantially perpendicularly oriented pipe 70 (see FIG. 1).

As best shown in FIGS. 6 and 7, the yoke 112 has a generally U-shaped portion 200 including a flat end wall 120, a first inner side wall 122a and a second inner side wall 124a, coupled to a pair of generally J-shaped portions 202 and 204 with respective third and fourth outer side walls 122b and 124b. The first side wall 122a and second side wall 124a are spaced from one another and are joined to the end wall 120. Further, the first side wall 122a and third side wall 122b are adjacently spaced in generally parallel relation, and joined via the curved part of the J-shaped portion 202. Similarly, the second side wall 124a and fourth side wall 124b are adjacently spaced in generally parallel relation, and joined via the curved part of the J-shaped portion 204. Stated differently, the J-shaped portions 202, 204 in combination with respective inner side walls 122a, 124a form respective U-shaped members 170, 172 having respective inner side walls 122a, 124a and respective outer side walls 122b, 124b.

The first side wall 122a has an elongated first slot 126a extending through an edge 127a of the first side wall 122a. Similarly, the second side wall 124a has an elongated second slot 128a extending through an edge 129a of the second side wall 124a. The third side wall 122b has an elongated third slot 126b extending through an edge 127b of the side wall 122b. Similarly, the fourth side wall 124b has an elongated fourth slot 128b extending through an edge 129b of the side wall 124b. Preferably, the first slot 126a, the second slot 128a, the third slot 126b and the fourth slot 128b are aligned to enable them to receive a flange, for example, the top vertical flange 60 of the bar joist 56 shown in FIG. 1. Preferably, the slots 126a, 128a, 126b, 128b are generally rectangular in shape. The first side wall 122a and the second side wall 124a have a respective first opening 134a and a second opening 136a extending through the breadths of the respective first side wall 122a and second side wall 124a. The first opening 134a and second opening 136a are spaced between the end wall 120 and the first slot 126a and the second slot 128a, respectively. Similarly, the third side wall 122b and the fourth side wall 124b have a respective third opening 134b and fourth opening 136b extending through the breadths of the respective third side wall 122b and fourth side wall 124b. The third opening 134b and the fourth opening 136b are spaced between the top of the "J" of the respective J-shaped portions 202, 204 and the third slot 126b and the fourth slot 128b, respectively. Preferably, the first opening 134a, the second opening 136a, the third opening 134b and the fourth opening 136b are aligned with one another to receive the locking bar 114, and are generally rectangular in shape. The end wall 120 has an aperture 142 which is spaced midway between the first and second side walls 122a, 124a (or, alternatively the third and fourth side walls 122b, 124b) and below the openings 134a, 136a, 134b and 136b. The aperture 142 is preferably substantially square-shaped to receive a square shaped portion of a carriage bolt or pin though it may be alternately shaped with efficacy, as needed or desired, and can receive a wide variety of bolts, pins and the like. The aperture 142 permits the clamp 110 to be attached to a bracing pipe via a fitting in a manner similar to the clamp 10, as is illustrated in FIG. 1.

The locking bar 114 (see FIGS. 6 and 7) is generally elongated and rectangular and extends through the yoke openings 134a, 134b, 136a, 136b. The locking bar 114 has a first end 143 positioned in the opening 134b of the side wall 122b and a second end 145 positioned in the opening 136b of the side wall 124b. The ends 143, 145 have a generally rectangular perimeter. The bar 114 is in a generally perpendicular relation to the side walls 122a, 122b, 124a, 124b. The bar 114 has a first threaded hole 144 and a second threaded hole 146. When the locking bar 114 is in position in the yoke 112 (as can be seen in FIG. 6) the first threaded hole 144 is positioned between the first opening 134a of the first side wall 122a and the third opening 134b of the third side wall 122b, and the second threaded hole 146 is positioned between the second opening 136a of the second side wall 124a and the fourth opening 136b of the fourth side wall 124b.

Preferably, the yoke 112 and the locking bar 114 are fabricated from hot-rolled low-carbon steel to meet the standards set by the Underwriters Laboratories (U.L.), Factory Mutual Engineering (F.M.), and other such quality control groups, though other suitable materials may also be used. Additionally, the yoke 112 and the locking bar 114 may have a plain or electro-galvanized finish.

Referring to FIGS. 6 and 7, the pair of first set screw 116 and the second set screw 118 have respective heads 148 and 150, and respective threaded portions 149 and 151 which threadably engage the threaded holes 144 and 146, respectively, of the locking bar 114. Preferably, the heads 148 and 150 are adapted to break off at a predetermined torque level. The diameter of the threaded portions 149, 151 is slightly smaller than the respective spacing between the first side wall 122a and the third side wall 122b and between the second side wall 124a and the fourth side wall 124b. This substantially restricts displacement of the bar 114, thereby capturing the locking bar 114 within the yoke side walls 122a, 124a, 122b and 124b. Preferably, the set screws 116 and 118 have cone points 153 and 155, respectively, for engaging a flange, such as the flange 60 shown in FIG. 1. The cone points 153, 155 deformably penetrate the flange material to provide a secure grip. Alternatively, the set screws 116 and 118 may employ cup points, if needed or desired. The set screws 116, 118 are long enough so that they can be threaded through the locking bar 114 to engage a flange positioned in the slots 126a, 128a, 126b, 128b without the screw heads 148, 150 contacting the yoke 112.

In a preferred form of the embodiment illustrated in FIGS. 6 and 7, the yoke 112 is about 0.25 inches in thickness. The overall peak dimensions of the yoke 112 are about 2.5 inches high, 3 inches wide, and 3.3 inches long. The end wall 120 is preferably about 2.5 inches high and spaces the first side wall 122a and the second side wall 124a by a distance of about 1.25 inches. The side walls 122a, 124a, 122b and 124b preferably have a height of about 2.5 inches. The first side wall 122a and the third side wall 122b are spaced from one another by a distance of about 0.53 inches. Similarly, the second side wall 124a and the fourth side wall 124b are spaced from one another by a distance of about 0.53 inches. The J-shaped portions 202 and 204 are about 2.5 inches long. The first slot 126a, second slot 128a, third slot 126b and fourth slot 128b have dimensions of about 0.4 inches× 1.375 inches and are substantially aligned with one another. The distance between the edges 190, 192, adjacent to the respective openings 134a, 136a, and the outer surface 194 of the end wall 120 is approximately 1.673 inches. The U-shaped portions (ears) 130, 132 are about 0.94 inches deep. The openings 134a, 136a, 134b and 136b have dimensions of about 0.36 inches×1.05 inches and are substantially aligned with one another. The centers of the openings 134a, 136a, 134b and 136b are about 0.775 inches below the plane of the edges 127a, 129a, 127b, 129b and spaced by about 1.25 inches from the outer surface 194 of the end wall 120. The aperture 142 is an about 0.5 inches substantially square hole and its center is about 0.875 inches high. Of course, those skilled in the art will recognize that these and other dimensions presented herein are illustrative of one preferred embodiment, and that the present invention may be alternatively dimensioned with efficacy, as required or desired.

Preferably, the locking bar 114 (see FIGS. 6 and 7) is about 0.31 inches thick and about 1 inch high which permits it to fit comfortably in the openings 134a, 136a, 134b and 136b of the yoke 112. Also, the length of the bar 114 is about 3.5 inches so that its ends 143, 145 slightly extend out of the openings 134b and 136b when the bar 114 is placed in the yoke 112. The spacing between the threaded holes 144 and 146 is preferably about 2.28 inches which disposes them between the openings 134a, 134b and the openings 136a, 136b, respectively. The threaded holes 144, 146 comprise standard ½-inch female threads.

Preferably, and referring to FIGS. 6 and 7, the threaded portions 149 and 151 of the set screws 116 and 118, respectively, comprise standard ½-inch threads, thereby, advantageously permitting minimum play of the respective screws 116, 118 in the 0.53 inches spacing between the first and third side walls 122a, 122b and between the second and fourth side walls 124a, 124b. As mentioned earlier, this substantially restricts displacement of the bar 114, thereby capturing the locking bar 114 within the yoke side walls 122a, 124a, 122b and 124b. The threaded portions 149 and 151 are preferably about 2 inches long so that the respective cone points 153 and 155 can firmly engage a flange disposed between the slots 126a, 128a, 126b and 128b of the yoke 112. Preferably, the set screws 116 and 118 are fabricated from a hardened carbon steel, though other suitable materials may be used with efficacy.

The present invention also prescribes a method for attaching the clamp 110 (FIGS. 6 and 7) to a flange. The method begins with the step of sliding slots 126a, 128a, 126b and 128b of the clamp 110 over the flange, for example, the top vertical flange 60 of the bar joist 56 which is shown in FIG. 1. Set screws 116 and 118 are threaded, by rotating their respective heads 148 and 150, through threaded holes 144 and 146 in the locking bar 114 which is disposed in the yoke 112 until cone points 153 and 155 of the respective set screws 116 and 118 just make contact with, for example, the flange 60. The set screws 116 and 118 are tightened, using, for example, a torque wrench (not shown), alternatingly or otherwise, until their heads 148 and 150, respectively, break off, whereby the set screws 116 and 118 securely engage the flange 60. This procedure results in the clamp 110 being firmly attached to a flange 60.

Thus, it can be seen that the set screws 116, 118 comprise means extending between the bar 114 and the flange 60 that connect the clamp 110 to the flange 60. If desired, means other than set screws may be employed to provide the necessary function. For example, this means can comprise a suitable wedge, such as a spring-loaded and/or cammed member, operable via a lever or the like and extending between the bar 114 and the flange 60. The means reacts against the bar 114 and presses the flange 60 against the portions of the side walls 122a, 124a, 122b, 124b forming respective edges 191a, 193a, 191b, 193b of the respective slots 126a, 128a, 126b, 128b.

The use of the clamp 110 (FIGS. 6 and 7) is similar to that of the clamps 10 and 10' (see FIGS. 1 to 3), and it may be used to support loads below bar joists, for example, the pipes 68 and 70 shown in FIG. 1. Preferably and advantageously, and referring to FIGS. 6 and 7, the U-shaped portions (ears) 130 and 132 formed between the slots 126a and 126b, and between the slots 128a and 128b, respectively, are about 0.94 inches deep which permits them to conveniently fit in the gap between the angle iron pairs of conventional bar joists, for example, the gap between the angle irons 58 and 59 of the bar joist 56 shown in FIG. 1. Additionally, the slots 126a, 128a, 126b and 128b are dimensioned to easily slip over the flange 60 of the bar joist 56 which is shown in FIG. 1.

The bar joist clamp 110 (see FIGS. 6 and 7) is capable of supporting substantially large loads. This is, in part, due to the availability of the four openings 134a, 136a, 134b and 136b in which the locking bar 114 resides and the four slots 126a, 128a, 126b and 128b in which the flange resides. In this manner, the load is not only distributed over the body of the yoke 112 but the locking bar 114 is also supported at four locations by the yoke 112 which resists bending and buckling of the bar 114. Advantageously, the placement of the set screws 116 and 118 ensures that the regions of high stress concentrations on the locking bar 114 are flanked by support from the side walls 122a, 124a, 122b, 124b of the yoke 112. Additionally, the particular materials and dimensions used in the construction of the clamp 110 further add to its ability to support substantially heavy loads.

Those skilled in the art will readily recognize that the clamp 110 (see FIGS. 6 and 7) may be used similarly to the clamps 10 and 10' (shown in FIG. 1) to support the substantially parallely oriented pipe 68 and the substantially perpendicularly oriented pipe 70 as shown in FIG. 1. Advantageously, and referring to FIG. 7, the distance of about 1.673 inches between the edges 190, 192 of the slots 126a, 128a and the outer surface 194 of the end wall 120 permits the end wall 120 of the clamp 110 to extend beyond a bar joist's horizontal flanges, and more specifically beyond the lower horizontal flange 96' of the bar joist 56', as is shown for the clamp 10' (FIG. 1). This allows a bracing pipe 64' to be secured by a fitting 66' to the clamp 110 such that the bracing pipe 64' extends downwards in a plane that is substantially parallel to the bar joist 56'. In this manner the clamp 110 can support a pipe 70 that is oriented substantially perpendicular to the bar joist 56'. Moreover, the clamp 110 can also be used to support ducts, sprinkler systems, fans, air-conditioners and other loads which are mounted below floors and ceilings, thereby further illustrating the versatility of the clamp of the present invention. Those of ordinary skill in the art will readily recognize that the clamp of the present invention can be mounted on to a variety of structures. For example, the clamp 110 may be attached to I-beams, H-beams, channels, plates, other flanged structures and the like. This versatility, advantageously, further adds to the adaptability and modularity of the clamp 110. Additionally, and as will be apparent to those skilled in the art, the clamp 110 may be used to suspend a pipe directly below and substantially parallel to a bar joist as is illustrated for the clamp 10 in FIG. 5.

The bar joist clamp 110 of the present invention may be manufactured by machining, casting or forging, but a preferred method of manufacturing the clamp 110 includes stamping flat strips of metal plate. Referring to FIG. 8A, a strip of metal plate is stamped into a generally rectangular shaped piece 112a. The stamping includes punching a pair of elongated slots 126a, 128a in respective first and second side walls 122a', 124a' of the piece 112a. The side walls 122a', 124a' are spaced by a central end wall 120'. The stamping also includes punching a pair of spaced closed openings 134a, 136a in a respective one of the first and second side walls 122a', 124a' between a respective one of the slots 126a, 128a and the end wall 120'. The stamping also includes punching a pair of elongated slots 126b, 128b in respective third and fourth side walls 122b', 124b' of the piece 112a. The side walls 122b', 124b' are adjacent to the side walls 122a', 124a', respectively. The stamping further includes punching a pair of spaced closed openings 134b, 136b in a respective one of the third and fourth side walls 122b', 124b' between a respective one of the slots 126b, 128b and a respective one of ends 180 and 182 of the piece 112a. The stamping further includes punching an aperture 142 in the end wall 120' spaced midway between the openings 134a and 136a and offset with respect to the openings 134a, 136a to define a generally triangular relationship. The first side wall 122a' and second side wall 124a' are bent towards one another, preferably approximately 90° with respect to the end wall 120', along the lines marked 152a and 154a (shown in FIG. 8A), respectively. The third side wall 122b' and fourth side wall 124b' are bent away from one another, preferably approximately 180° with respect to the respective first side wall 122a' and second side wall 124a', along the lines marked 152b and 154b (shown in FIG. 8A), respectively. This creates a yoke 112 (shown in FIGS. 6 and 7) with a generally U-shaped portion 200 including a flat end wall 120, a first side wall 122a and a second side wall 124a, coupled to a pair of generally J-shaped portions 202 and 204 with respective third and fourth side walls 122b and 124b, with the slots 126a, 128a, 126b and 128b being aligned with one another and the openings 134a, 136a, 134b and 136b being aligned with one another.

Referring to FIG. 8B, a strip of metal plate is stamped into a generally rectangular bar 114a. The bar 114a is sized and configured to fit within the closed openings 134a, 136a, 134b and 136b of the respective yoke side walls 122a, 124a, 122b and 124b (see, for example, FIG. 3). The stamping includes punching a pair of holes 144a and 146a through the bar 114a which are spaced such that the bar 114a can be positioned in the openings 134a, 136a, 134b, 136b of the yoke 112 (see FIGS. 6 and 7) with the hole 144a between the openings 134a and 134b while the hole 146a is simultaneously between the openings 136a and 136b. The holes 144a and 146a are threaded to form respective threaded holes 144 and 146, thereby creating a locking bar 114 (shown in FIGS. 6 and 7).

Referring to FIGS. 6 and 7, the locking bar 114 is inserted into the closed openings 134a, 136a, 134b, 136b of the respective yoke side walls 122a, 124a, 122b, 124b so that the threaded hole 144 is positioned between the opening 134a and the opening 134b, and the threaded hole 146 is positioned between the opening 136a and the opening 136b. A pair of set screws 116 and 118 are threaded into respective threaded holes 144 and 146 of the locking bar 114. The diameter of the threaded portions 149, 151 of respective set screws 116, 118 is slightly smaller than the respective spacing between the first side wall 122a and third side wall 122b and between the second side wall 124a and fourth side wall 124b. This substantially restricts displacement of the bar 114, thereby capturing the locking bar 114 within the yoke side walls 122a, 124a, 122b and 124b, and hence forming a clamp 110. The set screws 116, 118 are long enough to be threaded through the locking bar 114 to engage a flange, for example, the flange 60 shown in FIG. 1, positioned in the slots 126a, 128a, 126b, 128b so that the clamp 110 can firmly grip the flange.

The above-described method is especially suited for automated assembly lines, wherein stamping, punching and bending operations can be efficiently executed. The simplicity and speed of this manufacturing method results in an end-product that is economical to manufacture and, thus is desirably inexpensive. Of course, alternatively, and as mentioned before, the components of the bar joist clamp 110 may be machined but this process is more time consuming and, consequently, more expensive.

A Further Embodiment

Figure 9:
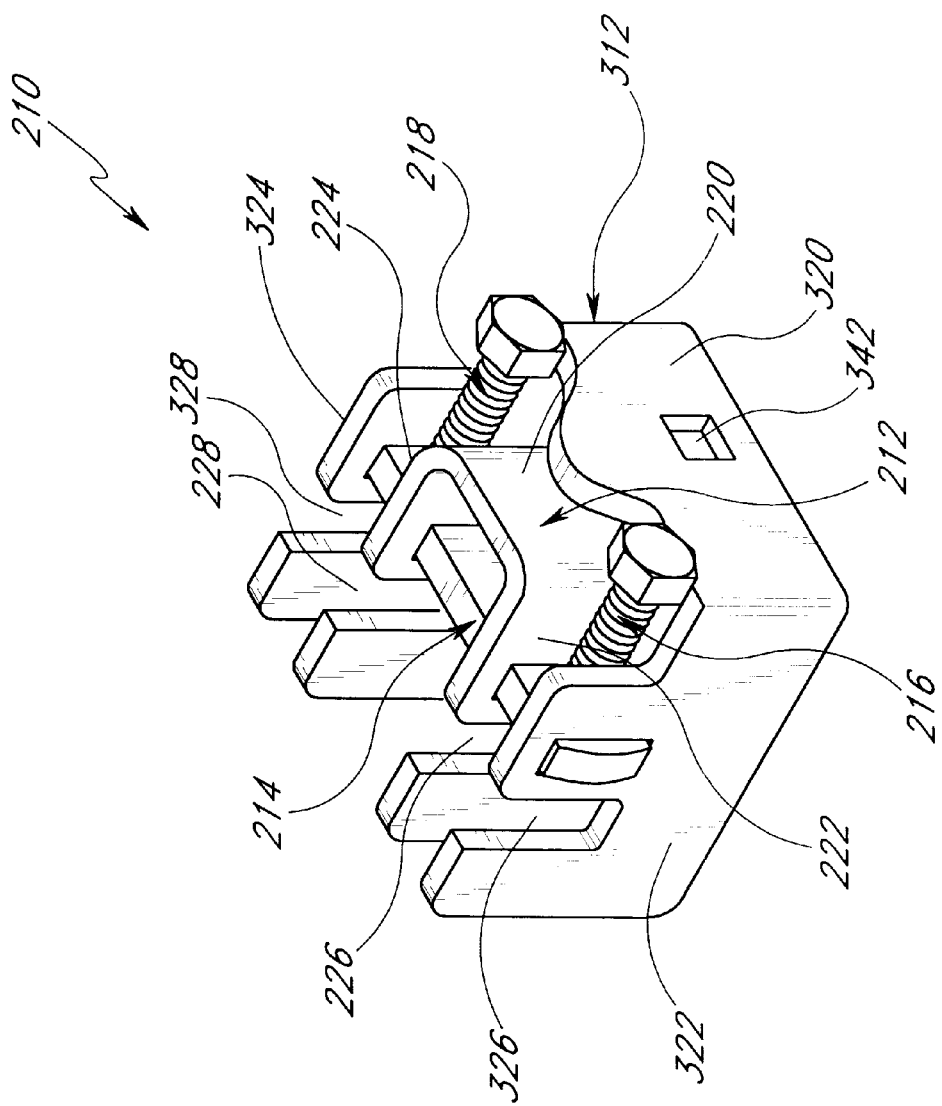
FIG. 9 is a perspective view of a further preferred embodiment of a bar joist clamp in accordance with the present invention.
Figure 10:
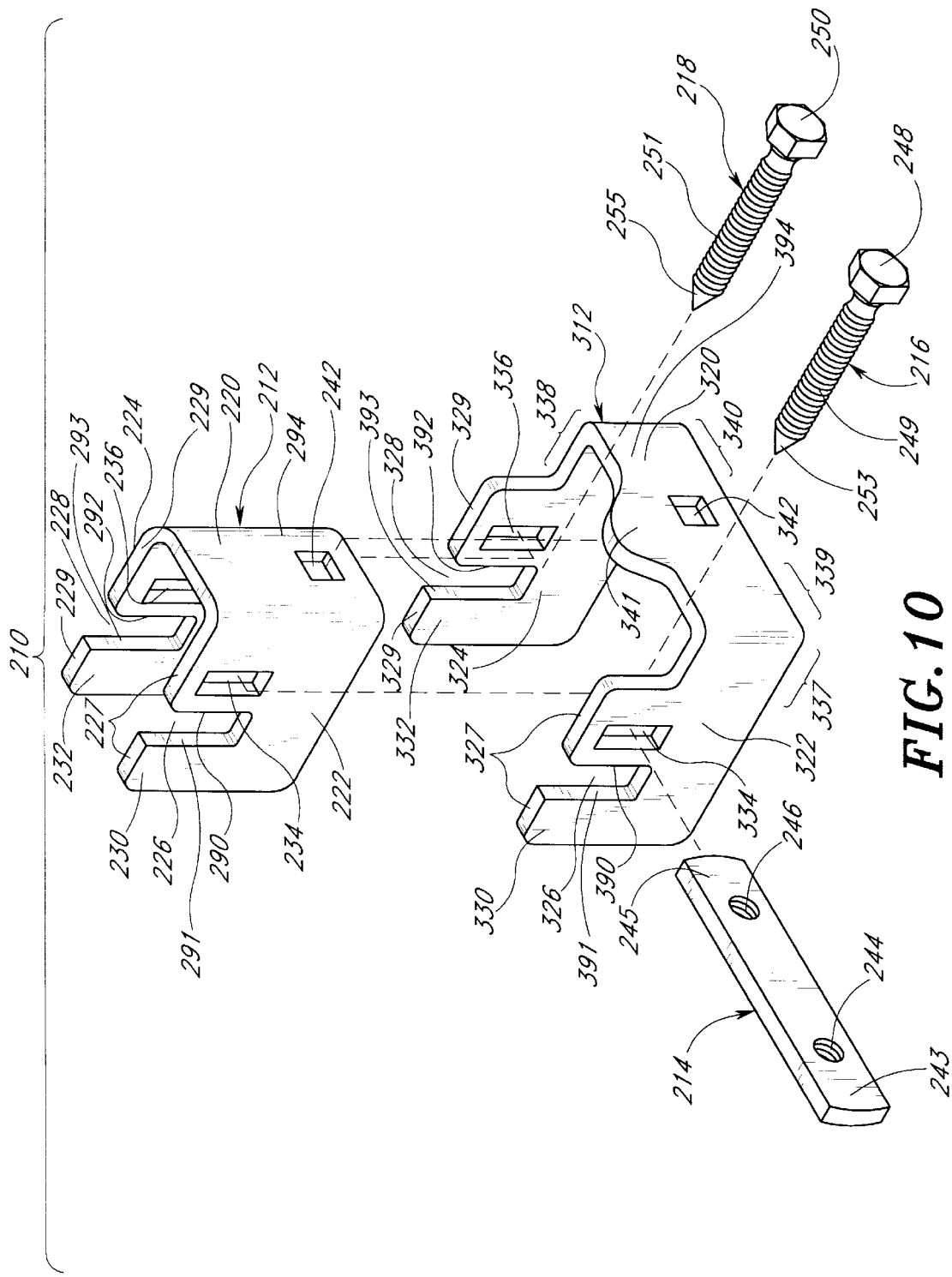
FIG. 10 is an exploded perspective view of the bar joist clamp of FIG. 9.

FIGS. 9 and 10 show a further embodiment of a bar joist clamp 210 constructed and assembled in accordance with the invention. FIG. 9 is a perspective view of the bar joist clamp 210 and FIG. 10 is an exploded perspective of the same clamp 210. Preferably, the bar joist clamp 210 comprises an inner yoke 212, an outer yoke 312, a locking or lock bar 214 and a pair of set screws 216 and 218, which firmly connect the clamp 210 to a flange such as the top vertical flange 60 of the bar joist 56 shown in FIG. 1. Though, for the sake of brevity, the drawings do not show the bar joist clamp 210 in use as a component for supporting a pipe below a bar joist, as shown for the clamps 10 and 10' in FIG. 1, it will be readily apparent to those skilled in the art that the mounting and use the of clamp 210 is similar to that of the clamps 10 and 10' and, hence, does not require further illustration. Thus, the bar joist clamp 210 may be used with efficacy to assist in supporting the substantially parallely oriented pipe 68 (see FIG. 1) or the substantially perpendicularly oriented pipe 70 (see FIG. 1).

The inner yoke 212 (FIGS. 9 and 10) is generally U-shaped and includes a flat end wall 220 and a pair of spaced side walls 222 and 224 joined to the end wall 220. The first side wall 222 has an elongated first slot 226 extending through an edge 227 of the first side wall 222. This forms an ear 230 at the free end of the side wall 222. Similarly, the second side wall 224 has an elongated slot 228, forming an ear 232, and extending from a closed end to an open end at an edge 229 of the second side wall 224. The slots 226 and 228 are aligned and open in the same direction to receive a flange, for example as shown in FIG. 1, the top vertical flange 60 of the bar joist 56. Preferably, the slots 226, 228 are generally rectangular in shape. The side walls 222 and 224 each have a respective opening 234 and 236 spaced between the end wall 220 and the respective slots 226 and 228. Preferably, the openings 234 and 236 are aligned and shaped to receive the bar 214, and are generally rectangular in shape. The end wall 220 has an aperture 242 which is spaced midway between the side walls 222 and 224, and below the openings 234 and 236. The aperture 242 is preferably substantially square-shaped to receive a square shaped portion of a carriage bolt or pin though it may be alternately shaped with efficacy, as needed or desired, and can receive a wide variety of bolts, pins and the like.

The outer yoke 312 (FIGS. 9 and 10) generally circumscribes the inner yoke 212 and is generally U-shaped. The outer yoke 312 includes a flat end wall 320 and a pair of spaced side walls 322 and 324 joined to the end wall 320. The outer yoke side walls 322, 324 are spaced from the respective inner yoke side walls 222, 224 to from a pair of respective gaps between the respective outer yoke side walls 322, 324 and the respective inner yoke side walls 222, 224 for receiving the respective screws 216, 218. The outer yoke side walls 322, 324 are in generally parallel relation to the respective inner yoke side walls 222, 224. The outer yoke end wall 320 is in generally parallel relation to the inner yoke side wall 220.

The outer yoke first side wall 322 has an elongated first slot 326 extending through an edge 327 of the first side wall 322. This forms an ear 330 at the free end of the side wall 322. Similarly, the outer yoke second side wall 324 has an elongated slot 328, forming an ear 332, and extending from a closed end to an open end at an edge 329 of the second side wall 324. The slots 326 and 328 are aligned with one another, and with the inner yoke slots 226 and 228, and open in the same direction to receive a flange, for example as shown in FIG. 1, the top vertical flange 60 of the bar joist 56. Preferably, the slots 326, 328 are generally rectangular in shape. The side walls 322 and 324 each have a respective opening 334 and 336 spaced between the end wall 320 and the respective slots 326 and 328. Preferably, the openings 334 and 336 are aligned with one another, and with the inner yoke openings 234 and 236, and shaped to receive the bar 214. Preferably, the openings 334, 336 are generally rectangular in shape. In one form of the invention, the side walls 322, 324 further have respective sections 337, 338, adjacent to the end wall 320, with reduced height to allow clearance for respective screws 216, 218, as discussed later. Alternatively, the lowered sections 337, 338 may have generally the same height as the rest of the respective side walls 332, 324.

The outer yoke end wall 320 has an aperture 342 which is spaced midway between the side walls 322 and 324, and below the openings 334 and 336. The aperture 342 is aligned with the inner yoke aperture 242 and is preferably substantially square-shaped to receive a square shaped portion of a carriage bolt or pin though it may be alternately shaped with efficacy, as needed or desired, and can receive a wide variety of bolts, pins and the like. The apertures 242 and 342 permit the clamp 210 to be attached to a bracing pipe via a fitting in a manner similar to the clamp 10, as is illustrated in FIG. 1. The end wall 320 further includes sections 339 and 340 having a reduced height to allow respective set screws 216 and 218 to threadably engage the locking bar 214. The end wall lowered sections 339, 340 are adjacent to the respective side wall lowered sections 337, 338 and flank a generally hump shaped central portion 341 of the end wall 320. The hump shaped central portion 341 includes the aperture 342 and extends higher than the lowered sections 339 and 340.

The locking bar 214 (FIGS. 9 and 10) is generally elongated and rectangular and extends through the inner yoke openings 234, 236 and the outer yoke openings 334, 336. The locking bar 214 has a first end 243 positioned in the opening 334 of the outer yoke side wall 322 and a second end 245 positioned in the opening 336 of the outer yoke side wall 324. The ends 243, 245 have a generally rectangular perimeter. The bar 214 is in a generally perpendicular relation to the inner yoke side walls 222, 224 and to the outer yoke side walls 322, 324. The bar 214 has a first threaded hole 244 and a second threaded hole 246. When the locking bar 214 is in position in the inner yoke 212 and outer yoke 312 (as can be seen in FIG. 9) the first threaded hole 244 is positioned between the inner yoke opening 234 and the outer yoke opening 334, and the second threaded hole 246 is positioned between the inner yoke opening 236 and the outer yoke opening 336.

Preferably, the inner yoke 212, the outer yoke 312, and the locking bar 214 are fabricated from hot-rolled low-carbon steel to meet the standards set by the Underwriters Laboratories (U.L.), Factory Mutual Engineering (F.M.), and other such quality control groups, though other suitable materials may also be used. Additionally, the inner yoke 212, the outer yoke 312, and the locking bar 214 may have a plain or electro-galvanized finish.

Referring to FIGS. 9 and 10, the first set screw 216 and the second set screw 218 have respective heads 248 and 250, and respective threaded portions 249 and 251 which threadably engage the threaded holes 244 and 246, respectively, of the locking bar 214. Preferably, the heads 248 and 250 are adapted to break off at a predetermined torque level. Each of the threaded portions 249, 251 can include a generally circumferential or annular groove near a respective one of the heads 248, 250. The diameter of the threaded portions 249, 251 is slightly smaller than the respective spacing between the inner yoke side wall 222 and the outer yoke side wall 322, and between the inner yoke side wall 224 and the outer yoke side wall 324. This substantially restricts displacement of the bar 214, thereby capturing the locking bar 214 within the yoke side walls 222, 224, 322 and 324. Preferably, the set screws 216 and 218 have cone points 253 and 255, respectively, for engaging a flange, such as the flange 60 shown in FIG. 1. The cone points 253, 255 deformably penetrate the flange material to provide a secure grip. Alternatively, the set screws 216 and 218 may employ cup points, if needed or desired. The set screws 216, 218 are long enough so that they can be threaded through the locking bar 214 to engage a flange positioned in the slots 326, 226, 228, 328. As indicated above, in one form of the invention, the reduced height sections 337, 338 of respective outer yoke side walls 322, 324 can allow the respective screw heads 248, 250 to extend over the sections 337, 338. Also, the reduced height sections 339 and 340 of the outer yoke end wall 320 can also permit the respective screw heads 248 and 250 to extend into the outer yoke 312.

In a preferred form of the embodiment illustrated in FIGS. 9 and 10, the inner yoke 212 is about 0.25 inches thick. The overall peak dimensions of the inner yoke 212 are about 2.5 inches high, 1.75 inches wide, and 2.7 inches long. The end wall 220 is preferably about 2.5 inches high and spaces the inner surfaces of the side walls 222 and 224 by about 1.25 inches. The side walls 222 and 224 preferably have a height of about 2.5 inches. The slots 226 and 228 have dimensions of about 0.4 inches×1.4 inches, and the distance between their respective edges 290, 292, adjacent to the respective openings 234, 236, and the outer surface 294 of the end wall 220 is approximately 1.39 inches. The ears 230, 232 have a width of about 0.9 inches. The openings 234, 236 have dimensions of about 0.36 inches×1.05 inches. The centers of the openings 234, 236 are about 0.75 inches below the edges 227, 229 respectively, and spaced by about 0.96 inches from the outer surface 294 of the end wall 220. The aperture 242 is an about 0.56 inches substantially square hole and its center is about 0.625 inches high. Of course, those skilled in the art will recognize that these and other dimensions presented herein are illustrative of one preferred embodiment, and that the present invention may be alternatively dimensioned with efficacy, as required or desired.

Preferably, the outer yoke 312 (FIGS. 9 and 10) is about 0.25 inches thick. The overall peak dimensions of the outer yoke 312 are about 2.5 inches high, 3.3 inches wide, and 3 inches long. The end wall 320 has a height greater than about 1.25 inches at its hump shaped central portion 341, and a height of about 1.25 inches at its reduced height sections 339, 340. The outer yoke end wall 320 is spaced from the inner yoke end wall 220 by about 0.03 inches. The end wall 320 spaces the inner surfaces of the side walls 322 and 324 by about 2.8 inches. This spaces the inner yoke side walls 222, 224 from the respective outer yoke side walls 322, 324 by a distance of about 0.53 inches, thereby providing clearance space for the respective screws 216, 218. The side walls 322 and 324 preferably have a peak height of height of about 2.5 inches with the reduced height sections 337, 338 having a height of about 1.25 inches. The slots 326 and 328 have dimensions of about 0.4 inches×1.4 inches, and the distance between their respective edges 390, 392, adjacent to the respective openings 334, 336, and the outer surface 394 of the end wall 320 is approximately 1.67 inches. This aligns the outer yoke slots 326, 328 with the inner yoke slots 226, 228 to receive a flange. The ears 330, 332 have a width of about 0.9 inches. The openings 334, 336 have dimensions of about 0.36 inches×1.05 inches. The centers of the openings 334, 336 are about 0.75 inches below the edges 327, 329 respectively, and spaced by about 1.24 inches from the outer surface 394 of the end wall 320. This aligns the outer yoke openings 334, 336 with the inner yoke openings 234, 236 to receive the locking bar 214. The aperture 342 is an about 0.56 inches substantially square hole and its center is about 0.625 inches high. This aligns the outer yoke aperture 342 with the inner yoke aperture 242 to receive a bolt. The skilled artisan will recognize that these and other dimensions presented herein are illustrative of one preferred embodiment, and that the present invention may be alternatively dimensioned with efficacy, as required or desired.

Preferably, the locking bar 214 (see FIGS. 9 and 10) is about 0.31 inches thick and about 1 inch high which permits it to fit comfortably in the inner yoke openings 234, 236 and outer yoke openings 334, 336. Also, the length of the bar 214 is about 3.5 inches so that its ends 243, 245 slightly extend out of the openings 334 and 336 when the bar 214 is positioned in the yokes 212 and 312. The spacing between the threaded holes 244 and 246 is preferably about 2.28 inches which disposes them between the openings 234, 334 and the openings 236, 336, respectively. The threaded holes 244, 246 comprise standard ½-inch female threads.

Preferably, and referring to FIGS. 9 and 10, the threaded portions 249 and 251 of the set screws 216 and 218, respectively, comprise standard ½-inch threads, thereby, advantageously permitting minimum play of the respective screws 216, 218 in the 0.53 inches spacing between the inner and outer yoke side walls 222, 322, and between the inner and outer yoke side walls 224, 324. As mentioned earlier, this substantially restricts displacement of the bar 214, thereby capturing the locking bar 214 within the yoke side walls 222, 224, 322 and 324. The threaded portions 249 and 251 are preferably between about 1.75 inches and 2.25 inches long so that the respective cone points 253 and 255 can firmly engage a flange disposed between the slots 226, 228, 326 and 328 of the clamp 210. Preferably, the included angle formed by each one of the cone points 253, 255 is about 90°. Preferably, the set screws 216 and 218 are fabricated from a hardened carbon steel, such as AISI steel 1035, though other suitable materials may be used with efficacy.

The present invention also prescribes a method for attaching the clamp 210 (FIGS. 9 and 10) to a flange. The method begins with the step of sliding slots 226, 228, 326 and 328 of the clamp 210 over the flange, for example, the top vertical flange 60 of the bar joist 56 which is shown in FIG. 1. Set screws 216 and 218 are threaded, by rotating their respective heads 248 and 250, through threaded holes 244 and 246 in the locking bar 214 which is disposed in the yokes 212, 312 until cone points 253 and 255 of the respective set screws 216 and 218 just make contact with the flange, for example, the flange 60. The set screws 216 and 218 are tightened, using, for example, a torque wrench (not shown), alternatingly or otherwise, until their heads 248 and 250, respectively, break off, whereby the set screws 216 and 218 securely engage the flange 60. This procedure results in the clamp 210 being firmly attached to a flange. In one form of the invention, the set screws 216, 218 are configured and dimensioned so that their respective heads 248, 250 break off at a torque between about 34 to 36 ft. lbs.

Thus, it can be seen that the set screws 216, 218 comprise means extending between the bar 214 and the flange 60 that connect the clamp 210 to the flange 60. If desired, means other than set screws may be employed to provide the necessary function. For example, this means can comprise a suitable wedge, such as a spring-loaded and/or cammed member, operable via a lever or the like and extending between the bar 214 and the flange 60. The means reacts against the bar 214 and presses the flange 60 against the portions of the side walls 222, 224, 322, 324 forming respective edges 291, 293, 391, 393 of the respective slots 226, 228, 326, 328.

The use of the clamp 210 (FIGS. 9 and 10) is similar to that of the clamps 10 and 10' (see FIGS. 1 to 3), and it may be used to support loads below bar joists, for example, the pipes 68 and 70 shown in FIG. 1. Preferably and advantageously, and referring to FIGS. 9 and 10, the inner yoke ears 230, 232 and outer yoke ears 330, 332 are about 0.94 inches deep which permits them to conveniently fit in the gap between the angle iron pairs of conventional bar joists, for example, the gap between the angle irons 58 and 59 of the bar joist 56 shown in FIG. 1. Additionally, the inner yoke slots 226, 228 and outer yoke slots 326, 328 of the clamp 210 are dimensioned to easily slip over the flange 60 of the bar joist 56 which is shown in FIG. 1.

The bar joist clamp 210 (FIGS. 9 and 10) is capable of supporting substantially large loads. This is, in part, due to the availability of the four openings 234, 236, 334 and 336 in which the locking bar 214 resides and the four slots 226, 228, 326 and 328 in which the flange resides. In this manner, the load is not only distributed between the bodies of the yokes 212, 312 but the locking bar 214 is also supported at four locations by the yokes 212, 312 which resists bending and buckling of the bar 214. Advantageously, the placement of the set screws 216 and 218 ensures that the regions of high stress concentrations on the locking bar 214 are flanked by support from the inner yoke side walls 222, 224 and outer yoke side walls 322, 324. Also, the close proximity between the inner yoke end wall 220 and outer yoke end wall 320 adds to the structural integrity of the clamp 210. Additionally, the particular materials and dimensions used in the construction of the clamp 210 further add to its ability to support substantially heavy loads.

Those skilled in the art will readily recognize that the clamp 210 (see FIGS. 9 and 10) may be used similarly to the clamps 10 and 10' (shown in FIG. 1) to support the substantially parallely oriented pipe 68 and the substantially perpendicularly oriented pipe 70 as shown in FIG. 1. Advantageously, and referring to FIG. 10, the distance of about 1.673 inches between the edges 390, 392 of the slots 326, 328 and the outer surface 394 of the outer yoke end wall 320 permits the end wall 320 of the clamp 210 to extend beyond a bar joist's horizontal flanges, and more specifically beyond the lower horizontal flange 96' of the bar joist 56', as is shown for the clamp 10' (FIG. 1). This allows a bracing pipe 64' to be secured by a fitting 66' to the clamp 210 such that the bracing pipe 64' extends downwards in a plane that is substantially parallel to the bar joist 56'. In this manner the clamp 210 can support a pipe 70 that is oriented substantially perpendicular to the bar joist 56'. Moreover, the clamp 210 can also be used to support ducts, sprinkler systems, fans, air-conditioners and other loads which are mounted below floors and ceilings, thereby further illustrating the versatility of the clamp of the present invention. Those of ordinary skill in the art will readily recognize that the clamp of the present invention can be mounted on to a variety of structures. For example, the clamp 210 may be attached to I-beams, H-beams, channels, plates, other flanged structures and the like. This versatility, advantageously, further adds to the adaptability and modularity of the clamp 210. Additionally, and as will be apparent to those skilled in the art, the clamp 210 may be used to suspend a pipe directly below and substantially parallel to a bar joist as is illustrated for the clamp 10 in FIG. 5.

The bar joist clamp 210 of the present invention may be manufactured by machining, casting or forging, but a preferred method of manufacturing the clamp 210 includes stamping flat strips of metal plate. Referring to FIG. 11A, a strip of metal plate is stamped into a generally rectangular shaped piece 212a. The stamping includes punching a pair of elongated slots 226, 228 in respective side walls 222', 224' of the piece 212a. The side walls 222', 224' are spaced by a central end wall 220'. The stamping also includes punching a pair of spaced closed openings 234, 236 in a respective one of the side walls 222', 224' between a respective one of the slots 226, 228 and the end wall 220'. The stamping further includes punching an aperture 242 in the end wall 220' spaced midway between the openings 234 and 236 and offset with respect to the openings 234, 236 to define a generally triangular relationship. The side walls 222' and 224' are bent, preferably approximately 90° with respect to the end wall 220', along the lines marked 252 and 254 (shown in FIG. 11A), respectively, to create a generally U-shaped inner yoke 212 (shown in FIGS. 9 and 10). The inner yoke 212 has an end wall 220 and side walls 222 and 224, with the inner yoke slots 226 and 228 aligned with one another to receive a flange, and the inner yoke openings 234 and 236 aligned with one another to receive the locking bar 214.

Referring to FIG. 11B, a strip of metal plate is stamped into a generally U-shaped piece 312a having a pair of side walls 322' and 324' spaced by a central end wall 320'. The stamping includes the act of forming reduced height sections 337', 338', adjacent to the end wall 320', in the respective side walls 322', 324'. The stamping also includes the step of forming a generally hump shaped central portion 341' flanked by reduced height sections 339', 340' in the end wall 320'. The end wall lowered sections 339', 340', are adjacent to respective side wall lowered sections 337', 338'. The stamping includes punching a pair of elongated slots 326, 328 in respective side walls 322', 324' of the piece 312a. The stamping also includes punching a pair of spaced closed openings 334, 336 in a respective one of the side walls 322', 324' between a respective one of the slots 326, 328 and a respective one of the reduced height sections 337', 338'. The stamping further includes punching an aperture 342 in the end wall 320' spaced midway between the openings 334 and 336 and offset with respect to the openings 334, 336 to define a generally triangular relationship. The side walls 322' and 324' are bent, preferably approximately 90° with respect to the end wall 320', along the lines marked 352 and 354 (shown in FIG. 11B), respectively, to create a generally U-shaped outer yoke 312 (shown in FIGS. 9 and 10). The outer yoke 312 has an end wall 320 and side walls 322 and 324, with the outer yoke slots 326 and 328 aligned with one another to receive a flange, and the outer yoke openings 334 and 336 aligned with one another to receive the locking bar 214. As indicated above, the dimensioning and configuration of the outer yoke 312 is such that in the assembled state of the clamp 210 (FIG. 9) the outer yoke slots 326, 328 are aligned with respective inner yoke slots 226, 228, the outer yoke openings 334, 336 are aligned with respective inner yoke openings 234, 236, and the outer yoke aperture 342 is aligned with the inner yoke aperture 242.

Referring to FIG. 11C, a strip of metal plate is stamped into a generally rectangular bar 214a. The bar 214a is sized and configured to fit within the inner yoke closed openings 234, 236 and the outer yoke closed openings 334, 336 of the bar joist clamp 210 (FIGS. 9 and 10). The stamping includes punching a pair of holes 244a and 246a through the bar 214a which are spaced such that the bar 214a can be positioned in the openings 234, 236, 334, 336 of the yokes 212 and 312 (see FIGS. 9 and 10) with the hole 244a between the openings 234 and 334 while the hole 246a is simultaneously between the openings 236 and 336. The holes 244a and 246a are threaded to form respective threaded holes 244 and 246, thereby creating a locking bar 214 (shown in FIGS. 9 and 10).

Referring to FIGS. 9 and 10, the outer yoke 312 is positioned around the inner yoke 212 so that the outer yoke openings 334, 336 are in general alignment with the inner yoke openings 234, 236. The locking bar 214 is inserted into the closed openings 234, 236, 334, 336 so that the threaded hole 244 is positioned between the opening 234 and the opening 334, and the threaded hole 246 is positioned between the opening 236 and the opening 336. As the bar 214 is positioned in the yokes 212, 312 further adjustment of the alignment between the yokes 212, 312 can be performed, if needed. The positioning of the bar 214 also aligns the slots 234, 236, 334, 336 and the apertures 242, 342. A pair of set screws 216 and 218 are then threaded into respective threaded holes 244 and 246 of the locking bar 214. The diameter of the threaded portions 249, 251 of respective set screws 216, 218 is slightly smaller than the respective spacing between the inner yoke side wall 222 and the outer yoke side wall 322 and between the inner yoke side wall 224 and outer yoke side wall 324. This substantially restricts displacement of the bar 214, thereby capturing the locking bar 214 within the yoke side walls 222, 224, 322 and 324, and hence forming a clamp 210. The set screws 216, 218 are long enough to be threaded through the locking bar 214 to engage a flange, for example, the flange 60 shown in FIG. 1, positioned in the slots 226, 228, 326, 328 so that the clamp 210 can firmly grip the flange.

The above-described method is especially suited for automated assembly lines, wherein stamping, punching and bending operations can be efficiently executed. The simplicity and speed of this manufacturing method results in an end-product that is economical to manufacture and, thus is desirably inexpensive. Of course, alternatively, and as mentioned before, the components of the bar joist clamp 210 may be machined but this process is more time consuming and, consequently, more expensive.

The utility and versatility of the present invention will be readily apparent to those skilled in the art. The bar joist clamp of the present invention can not only withstand substantially heavy loads and support and/or suspend a variety of loads, but is also adaptable to a variety of flanged structures, is simply and expeditiously installable, is economical to manufacture and, hence, desirably inexpensive.

While the components and method of the present invention have been described with a certain degree of particularity, it is manifest that many changes may be made in the specific designs, constructions and methodology hereinabove described without departing from the spirit and scope of this disclosure. It is understood that the invention is not limited to the embodiments set forth herein for purposes of exemplification, but is to be defined only by a fair reading of the appended claims, including the full range of equivalency to which each element thereof is entitled.

What is claimed is:

1. A clamp for clamping to the flange of a bar joist or other support structure comprising:
   a body having a pair of spaced, generally parallel side walls, with each wall having an elongated slot, each slot having a closed end and an open end opening to one edge of a respective side wall, with the slots opening in the same direction, and with the slots being configured to receive said flange;
   a bar extending between said side walls generally perpendicular thereto, the bar having one end supported by one side wall and an opposite end supported by the other side wall, said bar having at least one threaded hole; and
   at least one set screw extending through said at least one hole to engage said flange in said slots so as to firmly connect said clamp to said flange.

2. The clamp of claim 1, wherein said body includes an end wall extending between said side walls so as to cause said side walls and said end wall to form a yoke.

3. The clamp of claim 1, wherein said at least one hole comprises a pair of spaced holes each adjacent a respective one of said walls and wherein said at least one set screw comprises a pair of said screws respectively extending through said threaded holes to engage said flange.

4. The clamp of claim 3, including an end wall extending between said side walls such that the end wall and the side walls form a yoke.

5. The clamp of claim 4, wherein said end wall has a pair of spaced holes through which said set screws extend.

6. The clamp of claim 5, including an aperture in said end wall for connecting the clamp to a load.

7. The clamp of claim 1, including an end wall with at least one hole therethrough, and wherein said at least one set screw extends through said at least one end wall hole.

8. The clamp of claim 1, wherein each of said side walls has an opening for receiving a respective end of said bar so as to capture said bar in said openings.

9. The clamp of claim 8, including an end wall extending between said side walls and at least one hole in said end wall for receiving said at least one set screw.

10. The clamp of claim 1, including:
    an end wall extending between said side walls and wherein said side walls form the inner walls of U-shaped members each having an outer wall spaced from a respective one of said inner walls, said outer walls each having a slot aligned with the slots in the inner walls and adapted to receive said flange;
    said inner and outer walls each having an opening for receiving said lock bar whereby one end of said lock bar is supported between the inner and outer walls of one side member and the other end of the lock bar is supported between the inner and outer wall of said other support member; and
    wherein said at least one threaded hole in said lock bar includes a pair of threaded holes, with each hole positioned between a respective inner and outer wall; and
    said at least one set screw includes a pair of set screws each threaded through a respective one of said threaded holes to engage said clamp.

11. A combination comprising:
    a support joist having an elongated flange; and
    a clamp including a generally U-shaped yoke formed by a pair of spaced side walls and an end wall, said side walls each having a slot opening on one edge and configured to receive said joist flange, a lock bar extending between said side walls and supported by said side walls at a location between said flange and said end wall, one or more threaded openings formed in said lock bar, and one or more set screws extending through said one or more threaded openings and forced into engagement with said flange to lock the clamp onto said flange.

12. The combination of claim 11, wherein each of said side walls has an opening formed therein for receiving opposite ends of said lock bar.

13. The combination of claim 12, including one or more holes in said end wall through which said one or more set screws extend.

14. The combination of claim 12 wherein
    said bar joist includes an upper pair of angle irons separated by and attached to a plurality of struts, said angle irons including a vertically-oriented flange engaging said struts and a horizontally-extending flange joined to the upper end of said vertically-oriented flange; and
    said yoke slots are spaced from free ends of said side walls forming ears positioned between the slots and said free ends, said ears being dimensioned to fit between the vertically-extending flanges of said angle irons when said clamp is clamped to one of said vertically-extending flanges.

15. A clamp comprising:
    a yoke having an end wall and a pair of spaced side walls joined to said end wall, each of said side walls having an elongated slot opening in the same direction through one edge of a respective one of said side walls, said slots being aligned and configured to receive a flange, each of said side walls having an opening therethrough spaced between said end wall and a respective one of said slots, said end wall having a pair of spaced holes aligned with said side wall openings;
    an elongated bar having opposite ends configured to fit within a respective one of said side wall openings, said bar having a pair of spaced threaded holes that are adjacent said side walls when said bar is positioned in said yoke; and
    a pair of set screws, each extending through a respective one of said holes in said yoke end wall and threaded into said threaded holes in said bar, whereby, said bar is captured within said yoke side walls by said set screws, said set screws having sufficient length to engage said flange so as to firmly connect said clamp to said flange.

16. The clamp of claim 15, wherein said yoke is generally U-shaped.

17. The clamp of claim 16, wherein said end wall and said side walls are generally flat.

18. The clamp of claim 17, wherein said openings have a generally rectangular shape, and said bar ends have a generally rectangular perimeter.

19. The clamp of claim 15, wherein said end wall includes an aperture for receiving a pin which permits attachment of said clamp to an element for supporting a load.

20. The clamp of claim 15, wherein said slots have a generally rectangular shape.

21. The clamp of claim 15, wherein said openings are closer to said slots than to said end wall.

22. The clamp of claim 15, wherein said aperture in said end wall is spaced midway between said holes and offset with respect to said holes to define a generally triangular relationship.

23. The clamp of claim 15, wherein said end wall holes are closely adjacent to a respective side wall so that said set screws when inserted therein are close to a respective side wall.

24. A method of making a clamp for attachment to a flange, comprising the steps of:

stamping a strip of metal plate into a generally rectangular piece including stamping a pair of spaced elongated slots in side walls of said piece spaced by a central end wall, stamping a pair of spaced openings in a respective one of said side walls between a respective one of said slots and said end wall, and stamping a pair of spaced holes in said end wall adjacent said side walls;

bending said side walls approximately 90° with respect to said end wall to create a generally U-shaped yoke;

stamping a generally rectangular locking bar from a strip of metal plate, said bar being sized and configured to fit within said openings in said yoke side walls, punching a pair of holes through said bar spaced a distance approximately equal to the spacing between said pair of holes in said yoke;

forming threads in said holes in said bar;

inserting said bar into said openings in said side walls of said yoke and aligning said threaded holes in said bar with said holes of said yoke; and inserting a set screw through each of said holes in said yoke end wall and threading said set screws into said threaded holes in said bar, thereby capturing said bar in said yoke, said set screws being long enough to be threaded through said bar to engage a flange positioned in said slots to facilitate the gripping of said clamp to said flange.

25. The method of claim 24, wherein said step of stamping a strip of metal plate includes punching an aperture in said end wall spaced midway between said holes and offset with respect to said holes to define a generally triangular relationship.

26. A clamp comprising:

a yoke having a generally U-shaped portion, with a flat end wall and a pair of flat spaced side walls joined to the end wall, coupled to a pair of generally J-shaped portions each having a side wall adjacently spaced from a respective one of said U-shaped portion side walls, each of said side walls having an elongated slot opening in the same direction through one edge of each of said side walls, said slots being aligned to enable said slots to receive a flange, each of said side walls having an opening extending through the respective side walls, said U-shaped portion openings being spaced between said end wall and a respective one of said U-shaped portion slots, said end wall having a pin receiving aperture;

an elongated bar configured to fit within said side wall openings of said yoke, said bar having opposite ends each positioned in a respective one of said J-shaped portion side wall openings, said bar having a pair of spaced threaded holes, each said threaded hole being flanked by a respective one of said U-shaped portion side wall and said J-shaped portion side wall when said bar is positioned in said yoke; and a pair of set screws threaded into said threaded holes in said bar, threaded portions of said set screws having a diameter slightly smaller than spacing between a respective one of said J-shaped portion side walls and a respective one of adjacent said U-shaped portion side walls;

whereby, said bar is captured within said yoke by said set screws, said set screws having sufficient length to engage said flange so as to firmly connect said clamp to said flange.

27. The clamp of claim 26, wherein said end wall is spaced from said slots such that said clamp can be used to support a load oriented substantially perpendicular to and below said bar joist.

28. The clamp of claim 26, wherein said aperture in said end wall is spaced midway between said U-shaped portion side walls and below said slots.

29. A method of making a clamp for attachment to a flange, comprising the steps of:

stamping a strip of metal plate into a generally rectangular piece with a central end wall flanked by a first side wall adjacent to a third side wall and a second side wall adjacent to a fourth side wall, including stamping an elongated slot and a closed opening in each one of said side walls of said piece such that said first side wall slot and said third side wall slot are placed between said first side wall opening and said third side wall opening and said second side wall slot and said fourth side wall slot are placed between said second side wall opening and said fourth side wall opening, and punching an aperture in said end wall spaced midway between said first and second wall openings and offset with respect to said first and second wall openings to define a generally triangular relationship;

bending said first and second side walls approximately 90° with respect to said end wall and bending said third and fourth side walls approximately 180° with respect to said respective first and second side walls to create a yoke with a generally U-shaped portion, including said end wall and said first and second side walls, coupled to a pair of generally J-shaped portions, each including a respective one of said third and fourth side walls, said slots being aligned with one another and said openings being aligned with one another;

stamping a generally rectangular locking bar from a strip of metal plate, said bar being sized and configured to fit within said closed openings in said yoke walls, punching a pair of holes through said bar, the spacing between said holes being approximately equal to the average of the spacing between the said first and second yoke side walls and the spacing between said third and fourth yoke side walls;

tapping threads into said holes in said bar;

inserting said bar into said closed openings in said side walls of said yoke so that a respective one of said threaded holes is positioned between said first and third side walls and between said second and fourth side walls; and threading a set screw into each of said threaded holes in said bar, threaded portions of said set screws having a diameter slightly smaller than spacing between a respective one of said J-shaped portion side walls and a respective one of adjacent said U-shaped portion side walls, thereby capturing said bar in said yoke, said set screws being long enough to be threaded through said bar to engage a flange positioned in said slots to facilitate the gripping of said clamp to said flange.

30. A method of attaching a clamp to a flange, comprising the steps of:

sliding at least a pair of aligned slots formed of said clamp onto said flange; and threading a pair of set screws, through a pair of threaded holes disposed in a locking bar of said clamp until tips of said set screws grip said flange.

31. The clamp of claim 30, wherein said clamp includes a yoke, said yoke being generally U-shaped, said yoke having a pair of aligned slots to receive said flange and a pair of aligned openings to receive said bar, said bar having a pair of threaded openings to engage said set screws.

32. The clamp of claim 30, wherein said clamp includes a yoke, said yoke includes a generally U-shaped portion coupled to a pair of generally J-shaped portions, said yoke having four aligned slots to receive said flange and four aligned openings to receive said bar, said bar having a pair of threaded openings to engage said set screws.

33. A clamp comprising:

an inner yoke having an end wall and a pair of spaced side walls joined to said end wall, each of said inner yoke side walls having an elongated slot opening in the same direction through one edge of a respective one of said inner yoke side walls, each of said inner yoke side walls having an opening therethrough spaced between said inner yoke end wall and a respective one of said inner yoke slots;

an outer yoke generally circumscribing said inner yoke and having an end wall and a pair of spaced side walls joined to said end wall, each of said outer yoke side walls having an elongated slot opening in the same direction through one edge of a respective one of said outer yoke side walls, said outer yoke slots and said inner yoke slots being aligned and configured to receive a flange, each of said outer yoke side walls having an opening therethrough spaced between said outer yoke end wall and a respective one of said outer yoke slots, said outer yoke openings and said inner yoke openings being aligned;

an elongated bar configured to fit within said inner yoke openings and said outer yoke openings, said bar having opposite ends each positioned in a respective one of said outer yoke side wall openings, said bar having a pair of spaced threaded holes, each said threaded hole being flanked by a respective one of said outer yoke side walls and a respective one of said inner yoke side walls; and a pair of set screws extending over said outer yoke side wall and between a respective one of said outer yoke side walls and a respective one of said inner yoke side walls, said set screws being threaded into said threaded holes to capture said bar within said inner and outer yokes, said set screws having sufficient length to engage said flange so as to firmly connect said clamp to said flange.

34. The clamp of claim 33, wherein each of said inner yoke end wall and said outer yoke end wall includes a pin receiving aperture which permits attachment of said clamp to an element for supporting a load.

35. The clamp of claim 34, wherein said inner yoke aperture and said outer yoke aperture are aligned.

36. A method of making a clamp for attachment to a flange, comprising the steps of:

stamping a strip of metal plate into a generally rectangular first piece including stamping a pair of spaced elongated slots in side walls of said first piece spaced by a central end wall, stamping a pair of spaced openings in a respective one of said first piece side walls between a respective one of said first piece slots and said first piece end wall;

bending said first piece side walls approximately 90° with respect to said first piece end wall to create a generally U-shaped first yoke;

stamping a strip of metal plate into a generally U-shaped second piece including stamping a pair of spaced elongated slots in side walls of said second piece spaced by a central end wall, stamping a pair of spaced openings in a respective one of said second piece side walls between a respective one of said second piece slots and said second piece end wall;

bending said second piece side walls approximately 90° with respect to said second piece end wall to create a generally U-shaped second yoke with side walls spaced by a distance greater than the spacing between said first yoke side walls;

stamping a strip of metal plate into a generally rectangular third piece sized and configured to fit within said first yoke openings and said second yoke openings, and punching a pair of holes through said third piece spaced a distance greater than the spacing between said first yoke side walls and less than the spacing between said second yoke side walls;

forming threads in said third piece holes to create a locking bar;

aligning said first yoke and said second yoke so that said first yoke slots are aligned with said second yoke slots and said first yoke openings are aligned with said second yoke openings;

inserting said bar into said first yoke openings and said second yoke openings so that a respective one of said bar holes is flanked by a respective one of said first yoke side walls and a respective one of said second yoke side walls; and threading a set screw into each of said bar holes between a respective one of said first yoke side walls and a respective one of said second yoke side walls so that said bar is captured in said first yoke and said second yoke to form said clamp including said set screws having sufficient length to engage a flange positioned in said first yoke slots and said second yoke slots.

37. The method of claim 36, wherein said step of stamping a strip of metal plate into a generally rectangular first piece includes the step of punching a pin receiving aperture in said first piece end wall.

38. The method of claim 36, wherein said step of stamping a strip of metal plate into a generally U-shaped second piece includes the step of punching a pin receiving aperture in said second piece end wall.

39. A clamp for connecting a flange of a support structure to another element, said clamp comprising:

interconnected spaced side walls;

a bar extending between and supported by said side walls;

slots in said side walls for receiving said flange; and means extending between said bar and said flange to connect said clamp to said flange.

40. The clamp of claim 39, wherein said means and edges of said slots grip said flange.

41. The clamp of claim 39, wherein said means reacts against the bar and presses the flange against portions of the side walls forming edges of the slots.

* * * * *

UNITED STATES PATENT AND TRADEMARK OFFICE
CERTIFICATE OF CORRECTION

PATENT NO.   : 6,098,942
DATED        : August 8, 2000
INVENTOR(S)  : Richard W. Heath It is certified that error appears in the above-identified patent and that said Letters Patent is hereby corrected as shown below:

<u>Title page, Item [54] and Column 1, line 1,</u>
Title, delete "WITH LOCKING BAR".

<u>Column 28,</u>
Line 59, "between" should read -- through --; and "and" should read -- for engaging --.

Signed and Sealed this

Twentieth Day of April, 2004

JON W. DUDAS
*Acting Director of the United States Patent and Trademark Office*